(12) United States Patent
Jones et al.

(10) Patent No.: US 11,853,106 B2
(45) Date of Patent: Dec. 26, 2023

(54) PROVIDING ACCESS TO MULTI-FILE RELATED TASKS WITH VERSION CONTROL

(71) Applicant: Sony Interactive Entertainment LLC, San Mateo, CA (US)

(72) Inventors: Dustin Jones, San Mateo, CA (US); Jesse Clemens, San Mateo, CA (US); Gregg Carrier, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 122 days.

(21) Appl. No.: 17/223,374

(22) Filed: Apr. 6, 2021

(65) Prior Publication Data

US 2022/0171745 A1 Jun. 2, 2022

Related U.S. Application Data

(60) Provisional application No. 63/119,649, filed on Dec. 1, 2020.

(51) Int. Cl.
| | |
|---|---|
| *G06F 16/10* | (2019.01) |
| *G06F 16/18* | (2019.01) |
| *G06F 16/93* | (2019.01) |
| *G06F 16/178* | (2019.01) |
| *G06F 16/11* | (2019.01) |

(52) U.S. Cl.
CPC ........ *G06F 16/1873* (2019.01); *G06F 16/122* (2019.01); *G06F 16/1787* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 5,806,078 | A * | 9/1998 | Hug | G06F 40/18 |
| | | | | 707/999.203 |
| 6,549,916 | B1 * | 4/2003 | Sedlar | G06F 16/10 |
| 7,272,610 | B2 * | 9/2007 | Torres | G06F 16/93 |
| | | | | 707/999.102 |
| 10,984,484 | B1 * | 4/2021 | Nidecker | G06F 3/0482 |
| 2011/0296300 | A1 * | 12/2011 | Parker | G06Q 10/101 |
| | | | | 715/256 |
| 2012/0265836 | A1 * | 10/2012 | Nemoto | G06F 16/487 |
| | | | | 709/211 |
| 2015/0106790 | A1 * | 4/2015 | Bigwood | G06F 11/3624 |
| | | | | 717/127 |

* cited by examiner

*Primary Examiner* — Jau Shya Meng
(74) *Attorney, Agent, or Firm* — Penilla IP, APC

(57) ABSTRACT

A method for providing access to multi-file related tasks with version control is provided, including: receiving, through a task interface application executed by a client device, a command to open a task for processing by a local tool application on the client device, the command to open the task further identifying a specific version of the task; responsive to the command to open the task, transmitting, from the client device over a network to a server, a request for a plurality of files associated to the specific version of the task; receiving, by the client device over the network from the server, the plurality of files associated to the specific version of the task; initiating, by the task interface application, opening of the received plurality of files by the local tool application for editing on the client device.

16 Claims, 27 Drawing Sheets

Fig. 9

PROVIDING ACCESS TO MULTI-FILE RELATED TASKS WITH VERSION CONTROL

FIELD OF THE DISCLOSURE

The present disclosure relates to systems and methods for asset management, including version control systems and methods, asset management between remote sites, and providing access to multi-file related tasks with version control.

BACKGROUND

Description of the Related Art

Conventional file versioning systems provide version control of individual files. However, tracking file versioning on an individual basis, even when performed automatically, can be cumbersome and non-intuitive for the user. A given work task can involve multiple files as part of the same task, and therefore management of version control at the individual file level can be difficult for the user in terms of workflow and project management.

It is in the context that implementations of the disclosure arise.

SUMMARY OF THE DISCLOSURE

Implementations of the present disclosure provide systems and methods for asset management, including version control systems and methods, asset management between remote sites, and providing access to multi-file related tasks with version control.

In some implementations, a version control system implemented on at least one server computer is provided, including: a database that stores a plurality of tasks, each task having one or more versions, each version of a given task having files that are associated thereto; a server process that manages versioning of the tasks; wherein responsive to a request to check-out a first version of the given task, the server process retrieves and serves files associated to the first version of the given task; wherein responsive to a request to check-in the previously checked-out first version of the given task, the server process generates a second version of the given task, and receives and stores files in association with the second version of the given task.

In some implementations, the files stored in association with the second version of the given task include modified ones of the files associated to the first version of the given task.

In some implementations, the files stored in association with the second version of the given task include one or more new files that are not associated to the first version of the given task.

In some implementations, each task has associated metadata; wherein responsive to the request to check-in the previously checked-out first version of the given task, the server process receives updates to the metadata associated to the given task, and stores the updates in association with the second version of the given task.

In some implementations, the metadata includes a user assignment field, that enables assignment of the task to a user.

In some implementations, the metadata associated to the given task includes one or more editable attributes for the task, each editable attribute having a name, type, and value.

In some implementations, the requests to check-out and check-in are received over a network from a client user interface executed by a client device.

In some implementations, the retrieval and serving of the files associated to the first version of the given task copies said files to the client device.

In some implementations, the files stored in association with the second version of the given task are received from the client device.

In some implementations, the request to check-out is processed through the client user interface without individually selecting the files associated to the first version of the task.

In some implementations, a non-transitory computer readable medium is provided having program instructions embodied thereon, that, when executed by at least one server computer, cause said at least one server computer to implement a version control system, said version control system including: a database that stores a plurality of tasks, each task having one or more versions, each version of a given task having files that are associated thereto; a server process that manages versioning of the tasks; wherein responsive to a request to check-out a first version of the given task, the server process retrieves and serves files associated to the first version of the given task; wherein responsive to a request to check-in the previously checked-out first version of the given task, the server process generates a second version of the given task, and receives and stores files in association with the second version of the given task.

In some implementations, a method for asset management between remote sites is provided, including: implementing a first asset management system at a first site; implementing a second asset management system at a second site, the first and second asset management systems being remote from each other and configured to communicate over a network; processing a first set of changes to a first copy of a task stored by the first asset management system; processing a second set of changes to a second copy of the task stored by the second asset management system, the first copy of the task and the second copy of the task being configured to be synchronized; receiving, over the network at the second asset management system from the first asset management system, the second set of changes; receiving, over the network at the first asset management system from the second asset management system, the second set of changes; applying, by the first asset management system, merge rules to the first and second set of changes at the first site, to generate a first copy of a new version of the task stored to the first asset management system; applying, by the second asset management system, the merge rules to the first and second set of changes at the second site, to generate a second copy of the new version of the task stored to the second asset management system, that is equivalent to the first copy of the new version of the task stored to the first asset management system.

In some implementations, the merge rules identify a mergeable data portion and a non-mergeable data portion of the task.

In some implementations, for the non-mergeable data portion, the merge rules define acceptance of changes by a selected one of the first and second asset management systems to the exclusion of changes by the non-selected one of the first and second asset management systems.

In some implementations, the selected one of the first and second asset management systems is determined by traversing a hierarchy of entities to which the task belongs, until identification of the selected one is found.

In some implementations, the non-mergeable data portion includes one or more files that are atomically stored.

In some implementations, for the mergeable data portion, the merge rules define a precedence of each of the first and second asset management systems with respect to one or more fields of the mergeable data portion.

In some implementations, the precedence with respect to a given field defines acceptance of a change by a preferred one of the first and second asset management systems if available, and if the change by the preferred one is not available, then acceptance of a change by a non-preferred one of the first and second asset management systems.

In some implementations, the acceptance of the change by the preferred one of the first and second asset management systems if available, is to the exclusion of the change by the non-preferred one of the first and second asset management systems.

In some implementations, the precedence with respect to a given field defines acceptance of a change by a one of the first and second asset management systems that occurred earlier in time.

In some implementations, the precedence of each of the first and second asset management systems is determined by traversing a hierarchy of entities to which the task belongs, until identification of the precedence is found.

In some implementations, a non-transitory computer readable medium is provided having program instructions embodied thereon, that, when executed by at least one processor, cause said at least one processor to perform a method for asset management between remote sites, said method including: implementing a first asset management system at a first site; implementing a second asset management system at a second site, the first and second asset management systems being remote from each other and configured to communicate over a network; processing a first set of changes to a first copy of a task stored by the first asset management system; processing a second set of changes to a second copy of the task stored by the second asset management system, the first copy of the task and the second copy of the task being configured to be synchronized; receiving, over the network at the second asset management system from the first asset management system, the second set of changes; receiving, over the network at the first asset management system from the second asset management system, the second set of changes; applying, by the first asset management system, merge rules to the first and second set of changes at the first site, to generate a first copy of a new version of the task stored to the first asset management system; applying, by the second asset management system, the merge rules to the first and second set of changes at the second site, to generate a second copy of the new version of the task stored to the second asset management system, that is equivalent to the first copy of the new version of the task stored to the first asset management system.

In some implementations, a method for providing access to multi-file related tasks with version control is provided, including: receiving, through a task interface application executed by a client device, a command to open a task for processing by a local tool application on the client device, the command to open the task further identifying a specific version of the task; responsive to the command to open the task, transmitting, from the client device over a network to a server, a request for a plurality of files associated to the specific version of the task; receiving, by the client device over the network from the server, the plurality of files associated to the specific version of the task; initiating, by the task interface application, opening of the received plurality of files by the local tool application for editing on the client device.

In some implementations, the command to open the task is received through the task interface application without identifying specific ones of the plurality of files that are associated to the specific version of the task.

In some implementations, the task interface application communicates with the local tool application through a plug-in interface of the local tool application.

In some implementations, after the editing of the plurality of files through the local tool application on the client device, then receiving, through the task interface application, a command to version up the task; responsive to the command to version up the task, transmitting, from the client device over the network to the server, a request to store a new version of the task, and uploading the edited plurality of files from the client device to the server, wherein responsive to the request to store the new version of the task, the server generates the new version of the task and stores the edited plurality of files in association with the new version of the task.

In some implementations, the specific version is one of a plurality of versions of the task, each of the versions of the task having one or more files associated thereto.

In some implementations, the task further includes metadata associated thereto, the metadata defining an assignment of a user to the task.

In some implementations, the server accesses an asset management system to obtain the plurality of files associated to the specific version of the task.

In some implementations, the task interface application provides a view of a plurality of tasks stored to the asset management system.

In some implementations, the view is filtered by an assignment setting to a user of the client device.

In some implementations, the view further includes a priority setting of the tasks.

In some implementations, a non-transitory computer readable medium is provided having program instructions embodied thereon, that, when executed by at least one processor, cause said at least one processor to perform a method for providing access to multi-file related tasks with version control, said method including: receiving, through a task interface application executed by a client device, a command to open a task for processing by a local tool application on the client device, the command to open the task further identifying a specific version of the task; responsive to the command to open the task, transmitting, from the client device over a network to a server, a request for a plurality of files associated to the specific version of the task; receiving, by the client device over the network from the server, the plurality of files associated to the specific version of the task; initiating, by the task interface application, opening of the received plurality of files by the local tool application for editing on the client device.

In some implementations, a distributed assets management system or virtual file system is provided, enabling synchronization of files shared across multiple working sites. For example, different studios (worksites) are distributed in different geographic locations, such as Los Angeles, San Diego, Malaysia, or different parts of the world. Often, designers work alone on specific tasks related to animation or graphics for a specific project. At each specific site (local site), the server manages a copy of all the assets and metadata related to a project. When a designer is working on a specific task, that specific task is associated with a set of files and associated metadata for the various files. When a designer has completed working on certain files, updates made to the files are then saved and checked back into the server at the local site. A problem exists when files at a specific local site need to be synchronized with the files at other sites (i.e. other worksites). Because tasks being performed by designers utilize multiple files as a group, updates to files need to be made in a way that allows for synchronization with other sites. In this way, designers working in different sites will be utilizing the most up-to-date files of a larger project, without conflicts introduced by improper version control of the various files.

In some implementations, management of files as groups of files is provided. Implementations of the present disclosure relate to an improved way of managing files that are related to a group of files. When changes are made to a file, that file and the group of files are examined in accordance with predefined rules to determine when the updated file should be considered the most up-to-date file to be used by other sites when synchronization occurs. These rules include looking at file updates for conflicts upstream and downstream to determine if changes to specific files will cause problems when the file is utilized in specific groups of files for performing tasks. Therefore, files are not looked at as individual files with updates, but as a group of files that should be versioned as a collection of files and metadata. Versioning on a group of files as an entity and versioning on the metadata associated with those files will allow for individual file changes to be managed so as to avoid conflicts when such updated files are used in other groups of files.

In some implementations, conflict management and rule integration are provided. Managing these conflicts, i.e., by handling versioning at the group level provides additional usefulness to designers and artists that generally understand files from the collective effect that certain edits would make to other files of a group utilized for a task. That is, if an edit made to a file in a specific group would have a negative or conflicting effect when the file is used in another group, that information would be useful to the artist in understanding what changes should or should not be made. Thus, when a file that has been updated is checked back in, the group of files (including the metadata associated with each file) is split into individual files. If certain of the files from the group are dependent from or are used by other groups of files, those files are then merged and joined back with the update. Rules are therefore maintained to ensure that changes to certain files that could affect other groups of files are checked before the change is propagated and versioned into other groups of files. The checking associated with the version change is therefore first submitted to the system, checked for conflicts, and then published as an updated version that would avoid conflicts. Broadly speaking, the system avoids introduction of conflicts between groups of files when changes are made to specific files when performing a task.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

FIG. 9 conceptually illustrates a view of details for a task under a node, in accordance with implementations of the disclosure.

DETAILED DESCRIPTION

Figure 1:
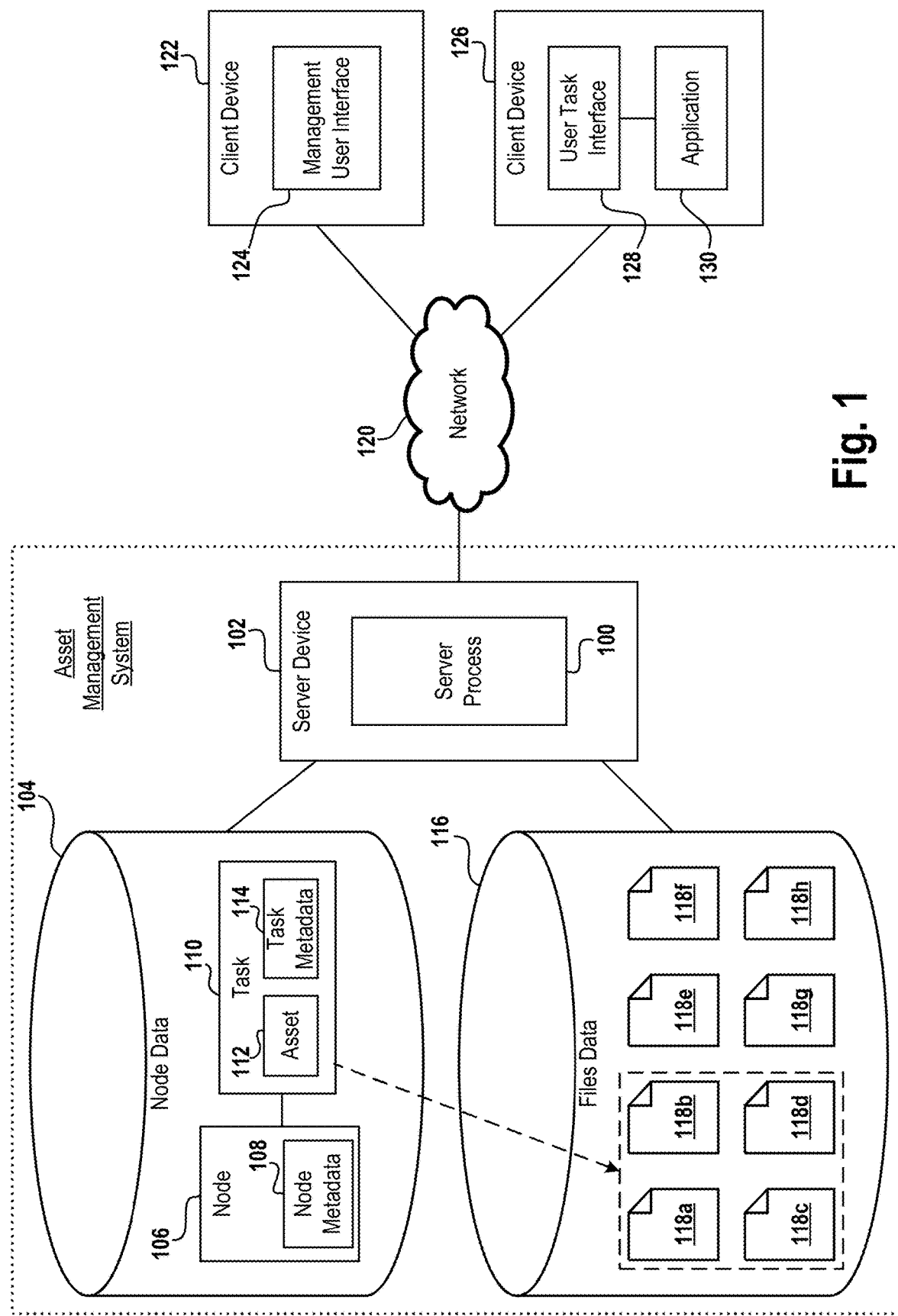
FIG. 1 conceptually illustrates a system for centralized asset management and version control, in accordance with implementations of the disclosure.

Broadly speaking, implementations of the present disclosure are drawn to an asset and workflow management system. The system is configured to support versioning on a variety of entity types, providing a flexible version control implementation that facilitates tracking of changes to files and metadata that go along with work being done. The system is designed to enable various types of entities to be created in the system, depending on what is desired to be atomically versioned and tracked.

Asset management systems in accordance with implementations of the disclosure, as configured to handle graphical media work, can broadly include two main pieces, those being actual files (e.g. meshes, textures, artist's working scenes, xml/json description files, etc.), and metadata that defines or describes the role of files in the system, who created a particular version, when it was created, how a file is used in association with other files, etc. Hence, in systems of the present disclosure, not only are versions of a file tracked but also metadata along with it. The system of the present disclosure enable storage of large quantities of binary files in a way that is both intuitive for humans to understand, but also advantageous for minimizing disk usage and ease of machine handling. Systems in accordance with implementations of the disclosure further encompass distributed implementations that enable distributed work on a common set of tasks and assets.

For purposes of the present disclosure, an entity is a unit having an atomic level of versioning in the system, such that when a new version of the entity is created, the versioning applies to the entity as a whole. Several types of entities are defined which can be versioned for systems in accordance with implementations of the disclosure.

A node is a collection of metadata representing a project or portion of a project. A node does not include file information, but provides an entity for storing state information and for organizational purposes. Nodes can be organized into hierarchical structures (e.g. parent-child relationships), and such can be visualized as a directory structure in some implementations. For example, a node can group together, or be the parent of, other entities in the system, including other nodes, and assets and tasks as described below.

An asset is a collection of one or more files that are versioned together. An asset can also include metadata which can be similar to or the same as metadata that nodes possess. Hence, in some implementations, an asset can be similar to a node that also includes additional file information.

A task is similar to an asset, including files and metadata, but also contains information about scheduling and assignment. Generally speaking, a task represents an actionable unit of work for performance by a user. By way of example without limitation, a task's metadata may identify who is assigned to work on the task, when it is supposed to be completed, what the priority of the task is, when the task should be started or ended, information about upstream and downstream connections, etc. In some implementations, tasks can be conceptualized into a directed graph which can be visualized to intuitively show linking of one task to another task. Importantly, tasks can be atomically versioned in the system, enabling tracking of task evolution over time, without requiring users to be involved in the tracking or versioning of individual files that are associated with tasks.

A file will be generally understood to have its ordinary meaning in the field of computer data storage. A file is typically configured for opening and processing by an application used to accomplish at least a portion of a task. In some implementations, files can have associated metadata, and files and their associated metadata information can be versioned in systems in accordance with implementations of the disclosure.

FIG. 1 conceptually illustrates a system for centralized asset management and version control, in accordance with implementations of the disclosure.

A server process 100 is executed by at least one server device 102, which in some implementations, can be one or more server computers or other processing hardware. The server process 100 provides access to files (118a, 118b, 118c, 118d, 118e, 118f, 118g, 118h) which are stored to a files data storage 116, as well as version control of various levels of entities, as described in further detail below. Broadly speaking, the server process 100 is configured to provide check-out of files for use by client devices, and check-in of files from the client devices, while tracking version history.

Nodes and tasks are stored to a node data storage 104, which can include a database configured to store data defining said nodes and tasks. An exemplary node 106 is shown, including node metadata 108, which can include data applicable to said node, such as associated users, settings or variables which may be applicable across sub-nodes or tasks within node 106, user notes related to the node, etc. As noted, nodes can be versioned in the system.

The node 110 further is a parent of an exemplary task 110, which includes an asset 112 and task metadata 114. The asset 112 is defined by the collection of files 118a, 118b, 118c, and 118d in the illustrated implementation, which are collectively versioned together as part of the task 110. The task metadata 114 can include data pertaining to the task 110, such as settings or variables for the task, user notes about the task, assigned users for the task, scheduling information for the task such as start date, due date, completion date, etc.

As shown in the illustrated implementation, the asset management system is implemented through the server process 100 which accesses and stores data to the node data storage 104 and the files data storage 116. The server process 100 communicates over a network 120 with one or more client devices, such as client devices 122 and 126. A management user interface 124 is executed by the client device 122, which provides an interface for accessing and viewing the nodes, tasks, and files of the asset management system. That is, the management user interface 124 submits requests from the client device 122 over the network 120 to the server process 100, and the server process 100 responds to such requests. For example, the server process 100 may retrieve and transmit requested information about or including the nodes, tasks, assets, files, metadata, etc. of the asset management system and transmit a response including such information over the network 120, which is surfaced through the management user interface 124 to a user of the client device 122. An example of a management user interface is discussed further below.

A user task interface 128 is executed by the client device 126. The user task interface 128 provides access to the asset management system for a specific user of the client device 126, and more specifically provides a listing of tasks that are assigned to the user. The user task interface 128 can be configured to communicate with a local application 130, such as through a plug-in API of the application 130. Broadly speaking, through the user task interface 128, the user can access an assigned task, and initiate opening of the files for the assigned task from the user task interface 128, which communicates to the server process 100 to retrieve and check-out the necessary files for the task, and initiates or opens them with the application 130 for the user to work on. When the user has completed their work, the user task interface 128 can be utilized to check-in modified files and/or new files for the task, which are transmitted to the server process 100 for versioning and storage. This may include creating a new version of the task, and storing the modified and/or new files in association with the new version of the task.

Figure 2A:
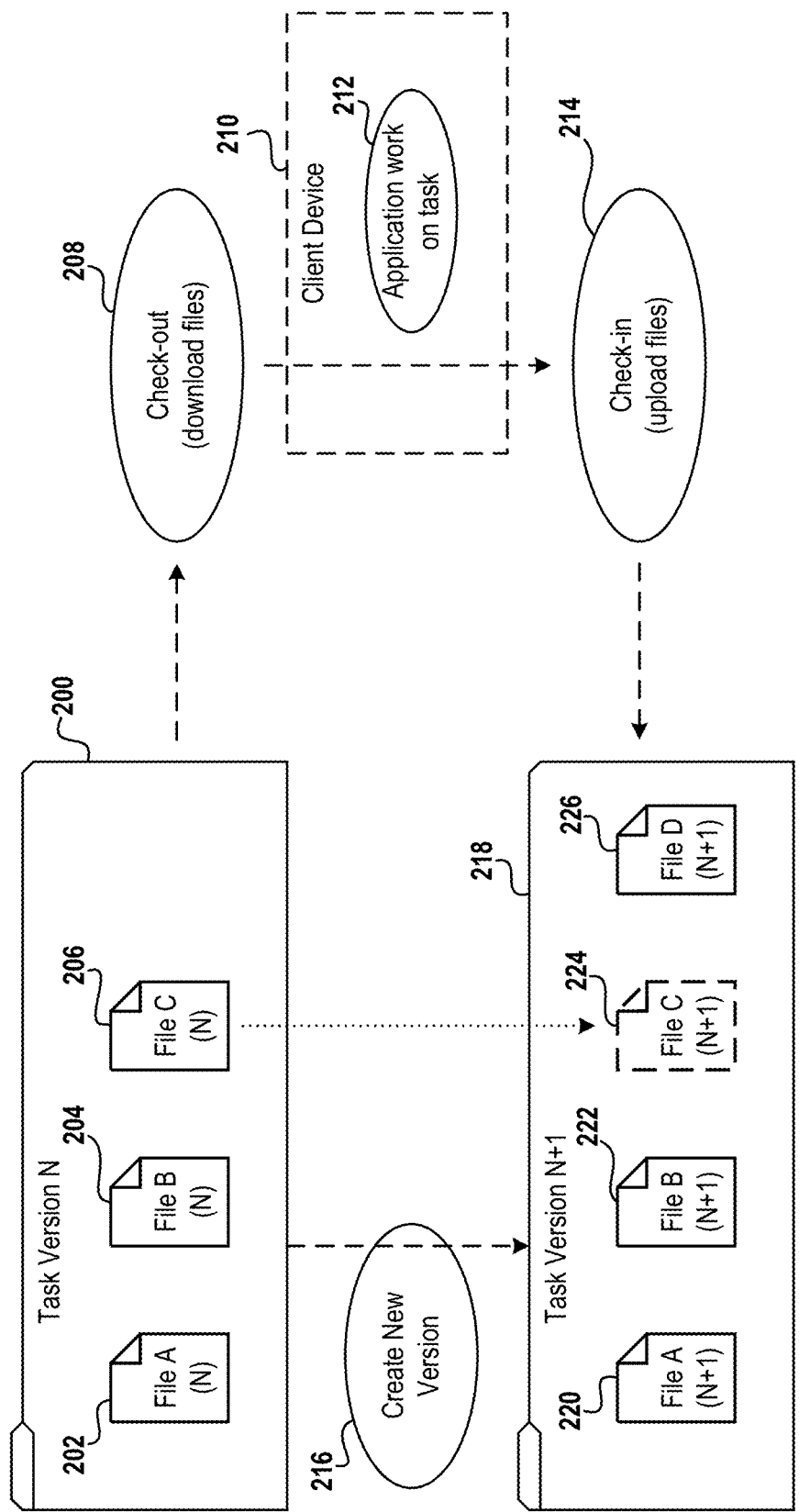
FIGS. 2A and 2B conceptually illustrate a workflow for working on a task and versioning a task using an asset management system, in accordance with implementations of the disclosure.
Figure 2B:
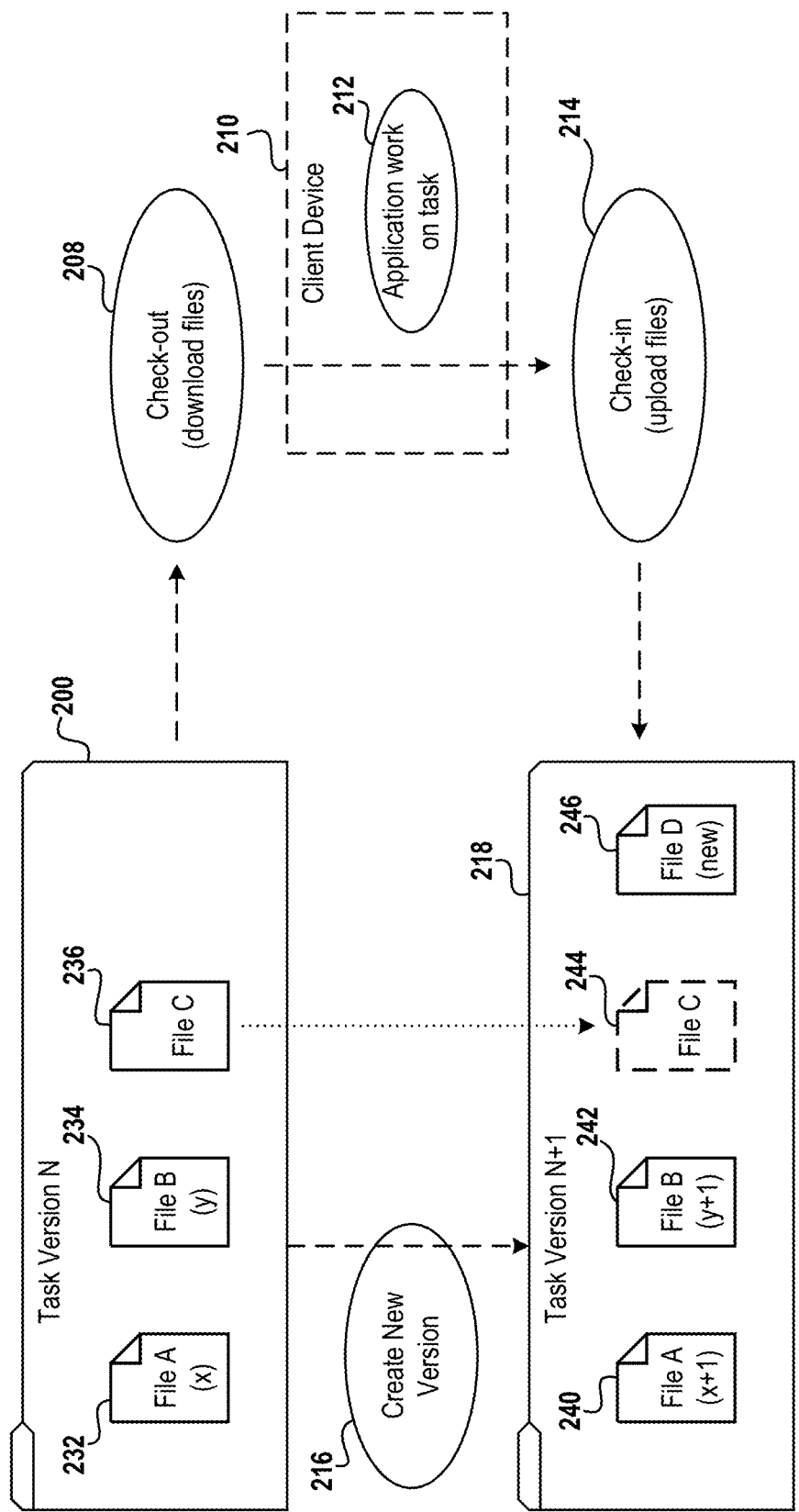

FIGS. 2A and 2B conceptually illustrate a workflow for working on a task and versioning a task using an asset management system, in accordance with implementations of the disclosure.

With reference to FIG. 2A, a task version N is conceptually shown at reference 200. As indicated, the version N of the task 200 includes various files 202, 204, and 206. When a user of a client device 210 that is accessing the asset management system, wishes to work on the task 200, they initiate a checkout process 208 through the asset management system. Through the checkout process, the files 202, 204, and 206 that are associated with the specific version N of the task 200, are downloaded to the client device 210. The downloaded files are opened by a local application at the client device 210, and the user of the client device 210 works on the task using the local application as indicated at reference 212.

Upon completion of working on the task, a check-in process 214 is initiated from the client device 210, which communicates to the asset management system to version up the task, and uploads files from the client device 210 to the asset management system for saving. As indicated at reference 216, in response, a new version of the task 218 (e.g. version N+1) is created in the system, and the uploaded files are stored in association with the new version of the task 218. It will be appreciated that during the course of working on the task, some of the files which were previously downloaded to the client device 210 may be modified, some files may be deleted, and/or new files may be created that will be associated with the new version of the task.

In the illustrated implementation, the version of each file in a task or asset is the same as the version of the task itself. Therefore, each of the files 202, 204, and 206 are version N as represented as part of the task version N. And accordingly, when the new version N+1 is made of the task (ref. 218), then the associated files 220, 222, 224, and 226 are all version N+1 as well.

In the case of file 206, no changes have been made as a result of working on version N, and therefore, the system does not actually store the file data a second time on disk. But the task version N+1 is instantiated to include the a version N+1 of the file (ref. 224), which defines a reference pointer to the same file data as file 206 (version N). Thus, one can request File C version N+1 and the correct file data would be found. In some implementations, this information is displayed to the user as task version information.

Accordingly, for a given file having unique data in three specific versions (e.g. v1, v5, and v8), if viewing the given file's versioning history, there would at least be versions v1, v5, and v8 in the versioning history, and there would possibly be other versions (e.g. v2, v3, v4, v6, v7, etc.) unless the file had been deleted in some of those versions; however, the other versions would not contain data that was different from a prior version from which no changes were made.

With reference to FIG. 2B, an alternative implementation for versioning of files associated to a task is shown. In the implementation of FIG. 2B, the files may have versions that are independent of the task version to which they are associated. The task version N is conceptually shown at reference 200, and includes various files 232, 234, and 236. In the illustrated implementation, the original file 232 associated with the first version of the task 200 (version x) was modified during the course of working on the task by the user to generate a new modified version of the file 240 (version x+1), which is now stored as part of the new version of the task 218. Similarly, the previously downloaded file 234 (version y) has been modified through the user's work on the task, generating a new version (y+1) of the file 242 that is also stored as part of the new version of task 218. It will be appreciated that the files have been individually versioned, while the task is versioning and tracking changes to the collective group of files.

In the case of the file 236, no changes were made to this file during the course of the user's work on the task, and thus the same file is carried forward for inclusion in the new version of the task 218 as conceptually indicated at reference 244. In some implementations, a new copy of the file 236 is not created so as to conserve storage resources, and the same file is referenced as part of the new version of the task 218.

Also shown in the illustrated implementation, a new file 246 has been created as a result of the user's work on the task, and this new file 246 has been uploaded as part of the check-in process. The new file 246 is stored in association with the new version of the task 218.

As noted, while the files can be individually versioned, the asset management system is providing versioning of the task as a whole, which includes identification of which versions of files are associated to which versions of the task. In this way, users do not need to concern themselves with the individual versions of files, or even which particular files are specifically in the collection of files for the task, but can simply relate to which version of the task they are seeking to access or work on, while the asset management system manages the tracking of which files and specific versions of files are associated with each version of the task. Thus, the user is freed to focus on the evolution of the task as a whole, as the asset management system handles storage and retrieval of the appropriate files for each version of the task. New versions of the task can be automatically generated as needed, and prior versions of the task can be accessed as well. This further enables viewing of the history of a task, so that a user can easily see changes from one version of the task to another.

By providing versioning at the task level, as opposed to only at the individual file level, the asset management system in accordance with implementations of the disclosure conceptually aligns with how users intuitively think about their work on a project or task basis, so that users do not need to be involved in intricate file management which can be arduous when a given task involves many files. Furthermore, by versioning tasks automatically, the asset management system more efficiently utilizes storage space, by for example, not creating unnecessary files in the system. For in prior attempts to track versions of a task involving many files in a manual fashion, in order to ensure no disturbance to the files of an existing version of a task, a complete copy of the files would need to be made and then work performed on the copy, which would form the new version. However, without a task versioning system to track which files have changed and which have not, then duplicate copies of files which have not been changed are maintained in the system, unnecessarily occupying disk storage space. The problem is compounded as more versions of the task continue to be made over time, as an unchanged file may be potentially duplicated several times over. Furthermore, unused or legacy files may continue to be copied and carried forward, further consuming storage space unnecessarily. Thus, by enabling automated version control at the task level, the asset management system in accordance with implementations of the disclosure provides improvements in the efficiency of computer resource utilization, especially conserving storage space.

While the asset management system in accordance with implementations of the disclosure is applicable to practically any type of task-based working context involving work product defined by data files, one context for which such a system is especially useful is that of computer-generated graphic asset creation, such as the creation of art assets, animations, scenes, cinematics, etc. for video games. The creation of such graphic assets can be multi-faceted, with many interdependent tasks being handled by different people/artists, and such tasks involving work on many files. Thus, for purposes of illustrating a working example demonstrating principles in accordance with the present disclosure, an asset management system for use by artists and others involved in generation of computer-generated graphical assets is described. The asset management system in accordance with implementations of the disclosure allows artists/animators/etc. to store working files and metadata into the system, track it through its various phases, and eventually produce a result which can be provided to a game creation team. The system provides version control for tools that generate data, so that the end result of the usage of such tools (e.g. character rig, etc.) is versioned in the system.

Figure 3A:
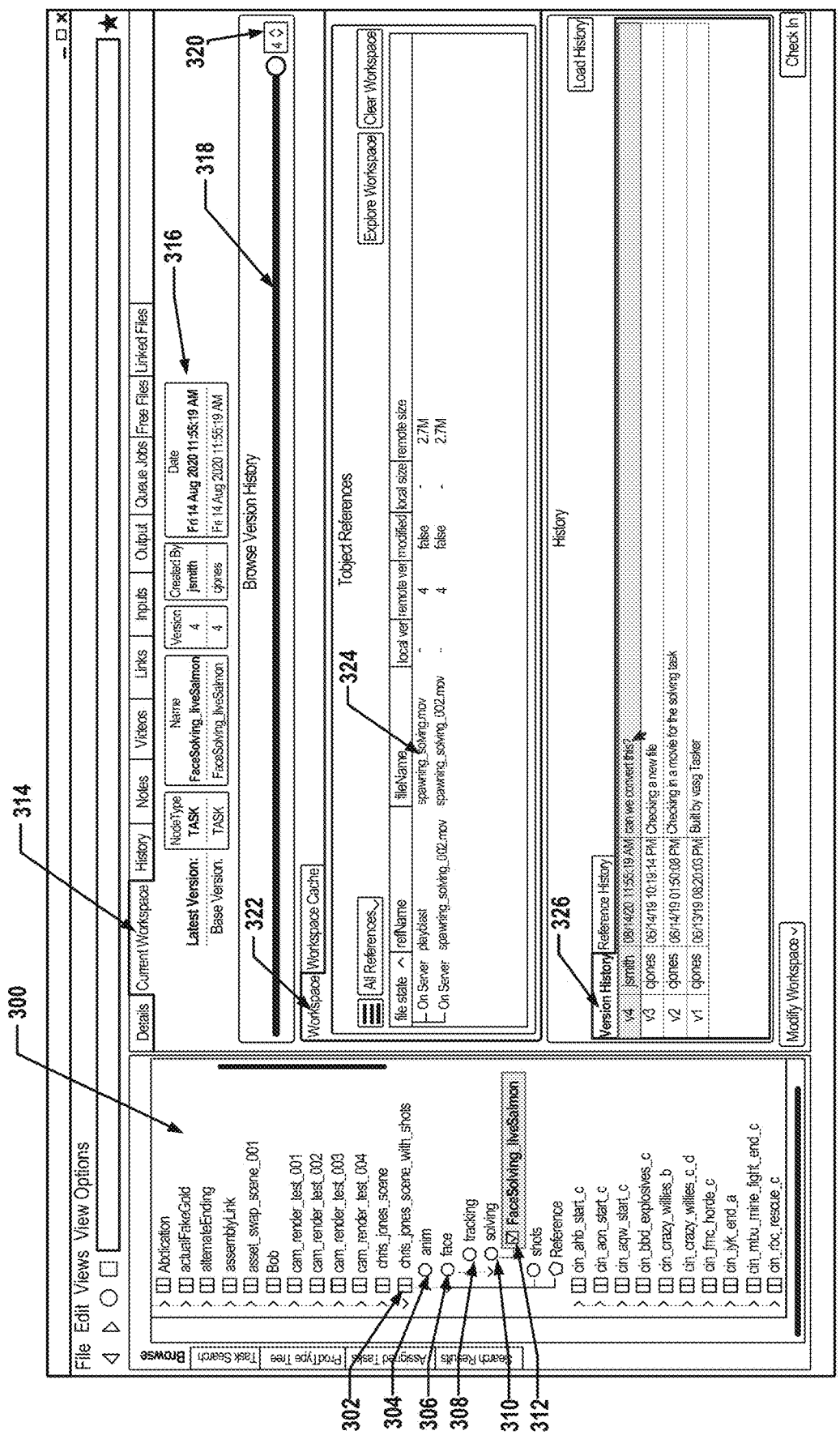
FIG. 3A illustrates an interface for accessing an asset management system, showing a current workspace view of a given task in the system, in accordance with implementations of the disclosure.

FIG. 3A illustrates an interface for accessing an asset management system, showing a current workspace view of a given task in the system, in accordance with implementations of the disclosure.

In some implementations, the interface is an example of the management user interface 124.

In the illustrated implementation, a node directory 300 is shown, illustrating a hierarchy of nodes, with nodes being expandable to expose sub-nodes or associated tasks in a hierarchical structure. For example, in the illustrated implementation, the node 302 has been expanded to reveal sub-nodes 304 and 306, with the sub-node 306 being expanded to reveal further sub-nodes 308 and 310, and sub-node 310 being expanded to reveal an associated task 312. In some implementations, the interface can provide navigation similar to a browser of a directory, enabling the user to navigate backward and forward to various nodes or tasks, or specific tabs or portions within nodes or tasks.

In the illustrated implementation, by way of example without limitation, the task 312 is a "facesolving" task, which broadly entails a process of applying an extracted 3D configuration (3D motion capture information) of an actor's face to a virtual character, such as an animated character or a video game character. The configuration of the actor's face is a 3D representation of the motion of the actor's face which is extracted from captured video of the actor's face (e.g. with the actor wearing specialized makeup and trackable dots or other markers from which to derive 3D position). Typically, a software animation tool is employed to perform an initial fit of the 3D motion capture information onto a character facial rig. Then an animator or artist reviews the results and makes edits to places where the automatic process did not achieve the desired result—e.g. the character's expression is not as desired, or there is a mismatch between the actor and the animated virtual character, or the actor's performance didn't achieve the desired result. Thus, the animator can be working to match the performance of the actor to the virtual character, and also making changes based on a desired animation performance, such as may be specified by a game director or cinematics director.

With continued reference to FIG. 3A, as indicated by its highlighting, the facesolving task 312 is currently selected in the view of the interface. By selecting the task 312 for viewing, the right portion of the interface displays information about task 312. In the illustrated implementation, a "Current Workspace" tab 314 is currently displayed. In the Current Workspace tab 314, various displays of information are present. For example, a portion 316 displays information about the latest version of the task, and the base version for which information is currently displayed within the tab. Thus, the user can easily comprehend which version of the task they are viewing as well as what is the latest version of the task. In the illustrated view, the latest version of the task 312 is version 4, which the user is currently viewing.

A version slider bar 318 enables a user to intuitively browse the version history of the task by sliding the selector across the bar. Also, the version can also be selected by interacting with a version selector 320, such as by selecting up and down arrows to enable stepping up or down versions, or directly entering a specific version number. As noted, the illustrated view is showing version 4 of the task 312, and thus the version slider bar 318 and the version selector 320 are currently set to version 4.

In a "Workspace" tab 322 the files (or objects) associated with the current version of the task are listed as indicated at reference 324. By way of example without limitation, the display of information about the files includes the file name, reference name, file state, version, and size. In the illustrated implementation, two video files are shown as being associated with the version of the task, which are more specifically remote versions stored by the asset management system. In some implementations, there can be local versions of files/objects.

In a "Version History" tab 326, a listing of the versions of the task are shown, including version number, a user ID of the user that created the version, the date and time the version was created, and a user-generated comment about the version.

Figure 3B:
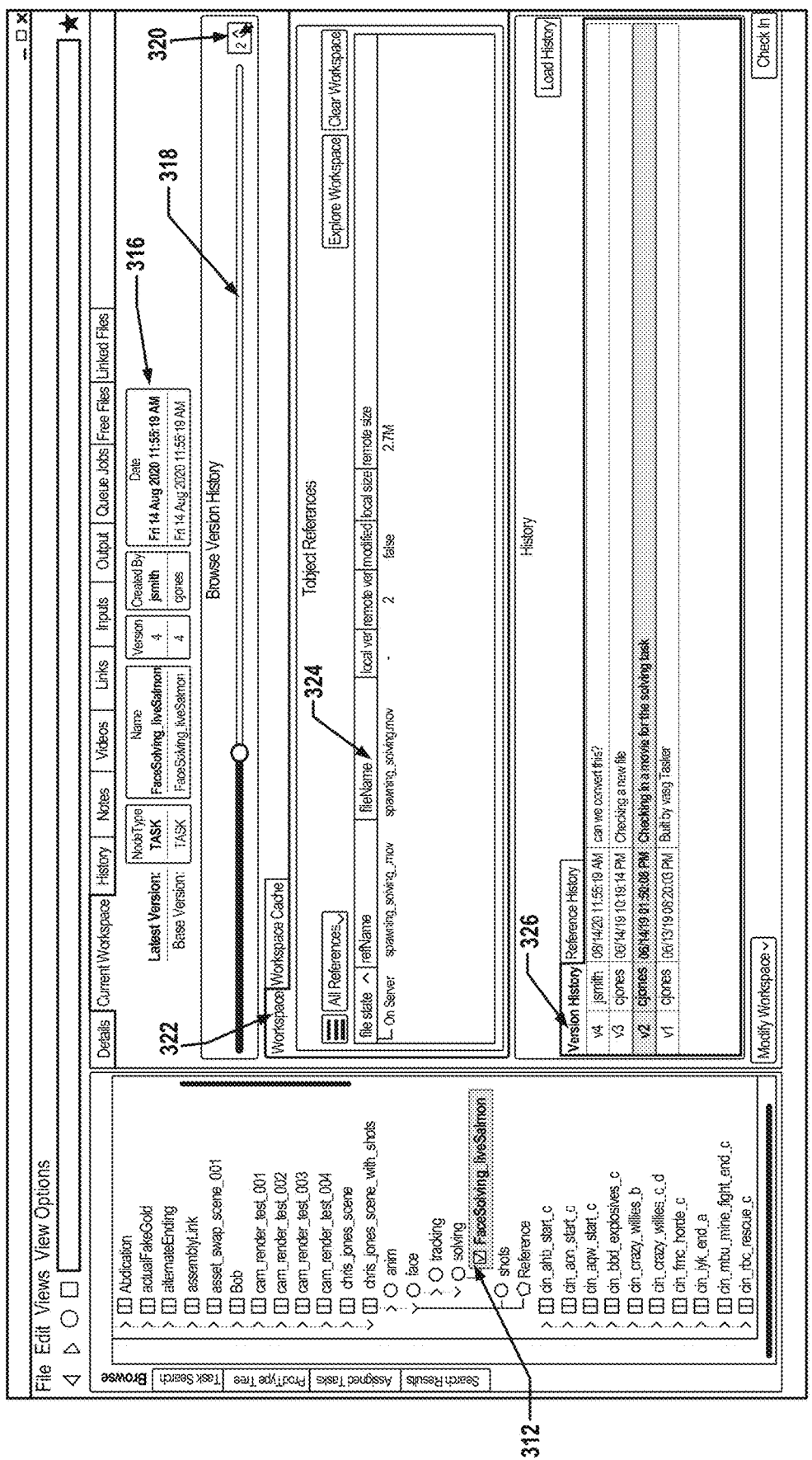
FIG. 3B illustrates an interface for accessing an asset management system, demonstrating browsing version history of a task, in accordance with the implementation of FIG. 3A.

FIG. 3B illustrates an interface for accessing an asset management system, demonstrating browsing version history of a task, in accordance with the implementation of FIG. 3A.

In the illustrated implementation, the view shown is similar to that of FIG. 3A except that the user has navigated to an earlier version of the task 312. This can be accomplished by either adjusting the version slider bar 318 as shown, or by toggling or entering a specific version via the version selector 320. In the illustrated implementation, the user has navigated to version 2 of the task 312. This is thus reflected in the portion 316 of the interface, which now shows version 2 as the "Base Version", along with the user that created version 2, and its creation date and time.

With continued reference to FIG. 3B, in the Workspace tab 322, the files/objects 324 that are shown to be associated with version 2 of the task are different than those associated with version 4 of the task (shown at FIG. 3A). Thus, the user is able to browse the version history of the task, and review how files/objects associated to a task have changed over the course of the different versions of the task. In the Version History tab 326, version 2 of the task is now highlighted, and its attendant information is thus highlighted, including the user that created version 2, the date and time that version 2 was created, and comments associated with version 2 of the task 312.

Thus, in accordance with implementations of the disclosure, multiple files that make up a collection for a given task, can be grouped together, and referenced and versioned as a single item. While in other revision control systems the atomic level is the file, in accordance with implementations of the disclosure as described herein, the atomic level can be a task, with the task being an item that has a version, with multiple versions of the task being created and trackable over time. In some implementations, because the atomic level of versioning applies to the task, and not the individual file, in a task with multiple files, a user does not simply make a new version of one of the files, but even a change to only a single file can result in versioning up the task as a whole.

Figure 4A:
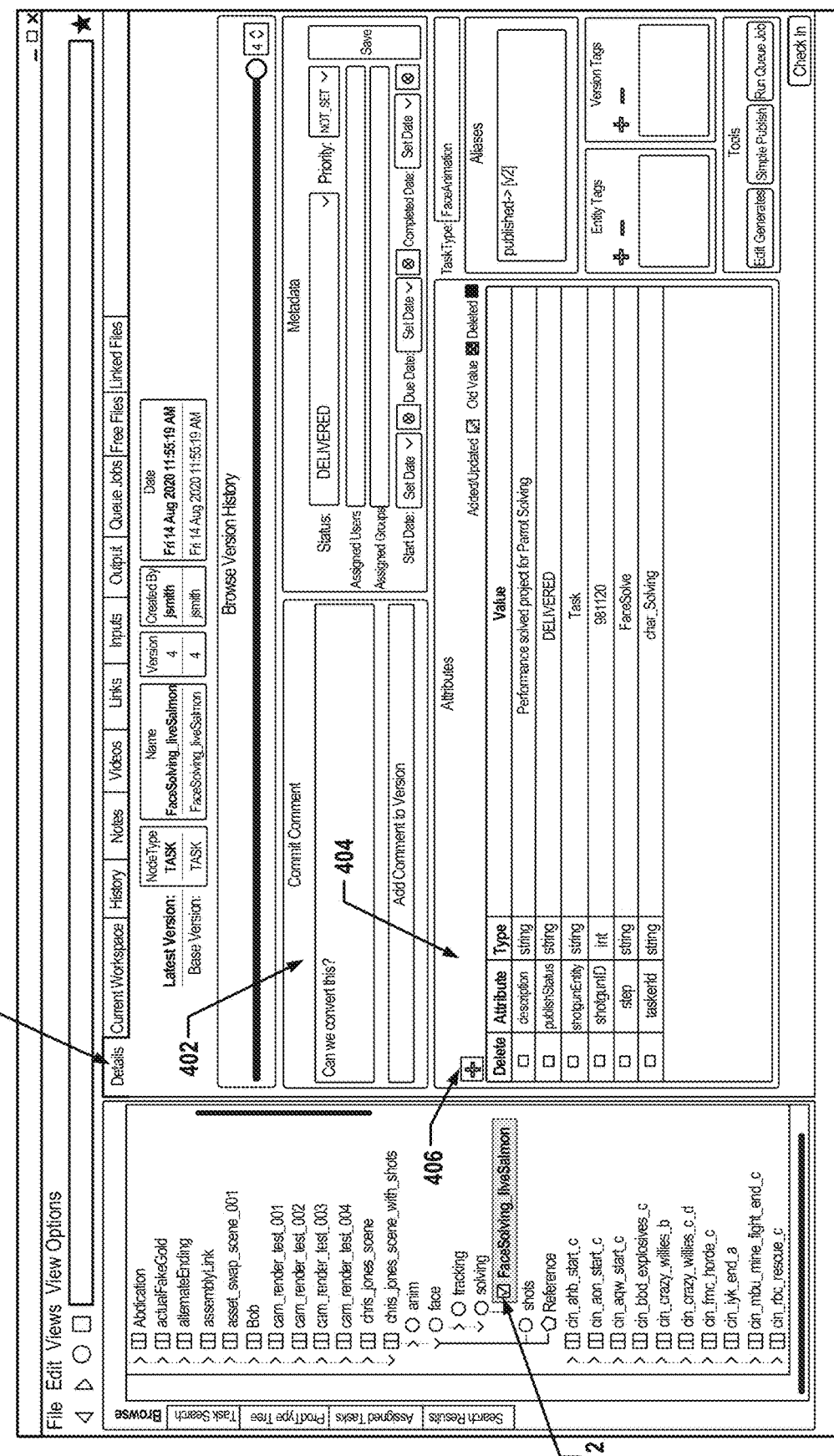
FIG. 4A conceptually illustrates an interface for viewing a task, illustrating a view of metadata details associated to the task, in accordance with implementations of the disclosure.

FIG. 4A conceptually illustrates an interface for viewing a task, illustrating a view of metadata details associated to the task, in accordance with implementations of the disclosure.

In the illustrated implementation, the view shows a "Details" tab 400 for the task 312, which broadly speaking, includes displays of various kinds of metadata that are associated to the task 312. For example, a comments interface 402 is provided whereby the user can input text comments to associate to the current version of the task.

An attributes portion 404 provides a section of metadata that can be flexibly defined by the user. As shown, attributes can be defined and associated to the task, each attribute having a name, a type, and a value. For example, in the illustrated implementation, an attribute named "description" is defined as a string (type) and having a value "Performance solved project for Parrot Solving".

Figure 4B:
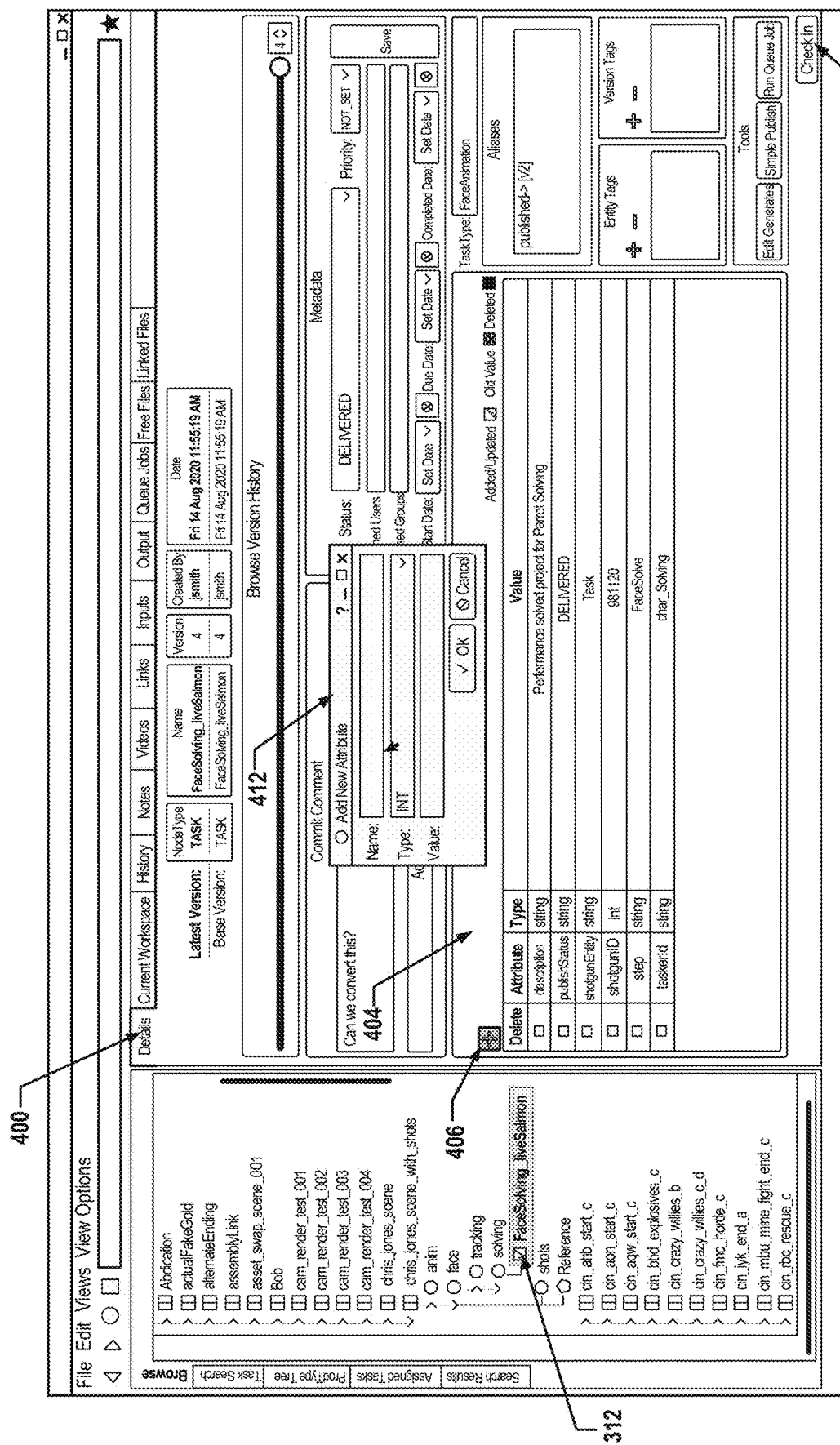
FIG. 4B conceptually illustrates an interface for creating an attribute for a task, in accordance with the implementation of FIG. 4A.

FIG. 4B conceptually illustrates an interface for creating an attribute for a task, in accordance with the implementation of FIG. 4A.

In the illustrated implementation, by selecting button 410 to add a new attribute, display of an attribute entry interface 412 is triggered. The attribute entry interface as shown includes fields for entry of the name of the attribute to be added, its type, and its value. By way of example without limitation, various attribute types can include date, time, boolean, integer, floating point, string, timecode, timespan, etc. Selection of the "OK" button saves the newly created attribute, and then when the task is checked-in, e.g. by selecting the "Check-in" button 414, then the new attribute is added with a new version of the task, which in this case would be version 5 of the task.

It will be appreciated that when a user reviews the history of different versions of the task, they can see how attributes have changed with each version. As can be seen, attributes provide a highly configurable context for users to store information in association with tasks, and by extension store information that is associated with the collection of files that are included in the task. The attributes can be configured to enable storage of information relevant to the given task, such as any variables related to the task, status indicators of aspects of the task, etc. Further, the attributes presently described which are associated with a task can apply to multiple files at once. Additionally, because the task is versioned as a whole, the attributes that may change from version to version of the task are tracked and easily reviewed if desired.

Figure 4C:
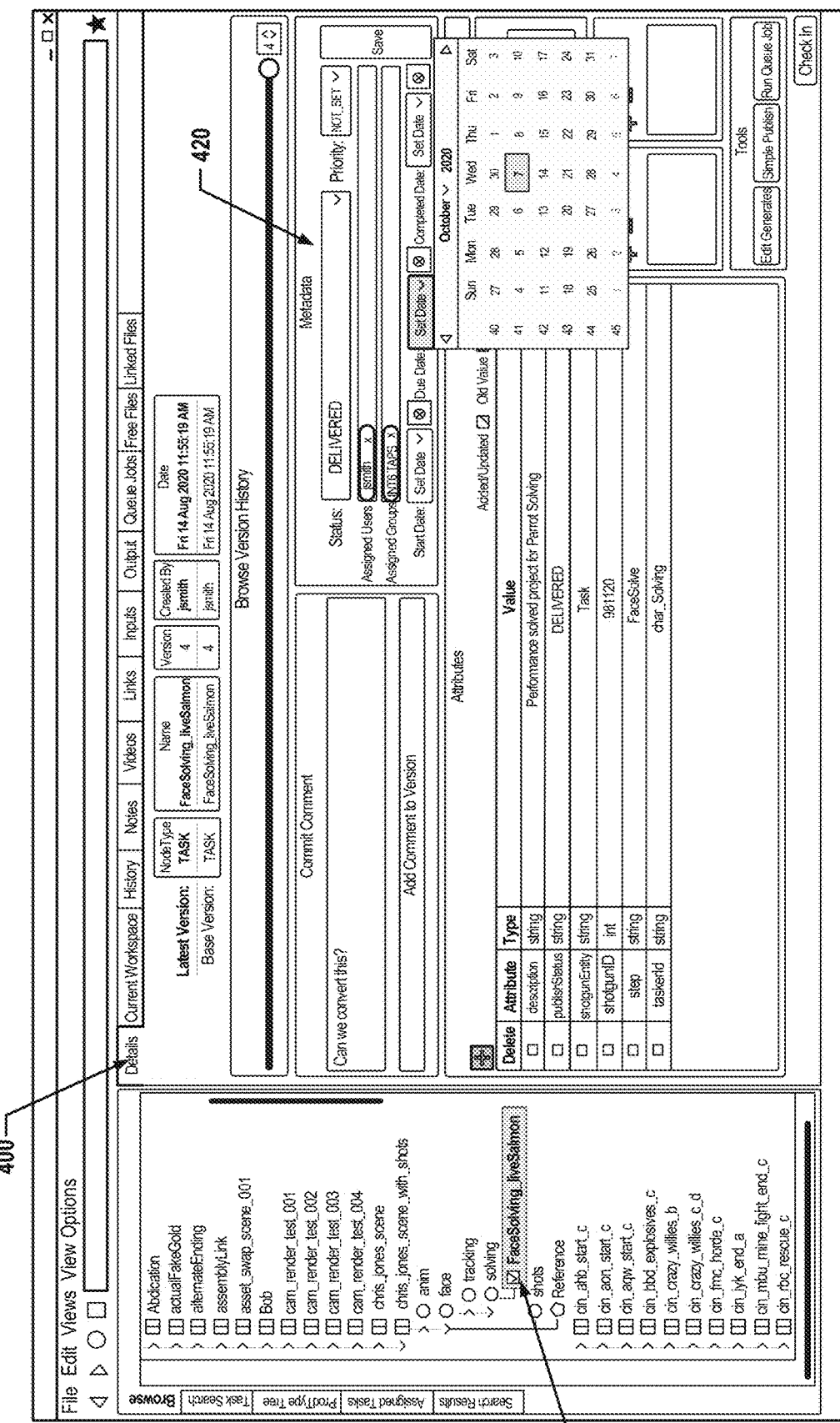
FIG. 4C conceptually illustrates an interface for entering scheduling and assignment information for a task, in accordance with the implementation of FIG. 4A.

FIG. 4C conceptually illustrates an interface for entering scheduling and assignment information for a task, in accordance with the implementation of FIG. 4A.

In the illustrated implementation, a section 420 of the Details tab 400 provides interface tools for assignment and scheduling of the task 312. As shown, the section 420 includes a "Status" field that can be set to various predefined statuses, e.g. not started, in progress, done, approved, delivered, final, on hold, ready to start, viewed, etc. A "Priority" field can be set to various priority settings, eg. low, medium, high. An "Assigned Users" field enables entry of user ID's (e.g. e-mail addresses or other user ID forms) to whom the task will be assigned. It is also possible to assign the task to groups via the "Assigned Groups" field. "Start Date," "Due Date," and "Completed Date" fields are provided as shown in the illustrated implementation, enabling entry of relevant scheduling information for the task, which can be numerically entered or set using a graphical calendar as shown with the respect to the "Set Date" field in the illustrated example.

Figure 5:
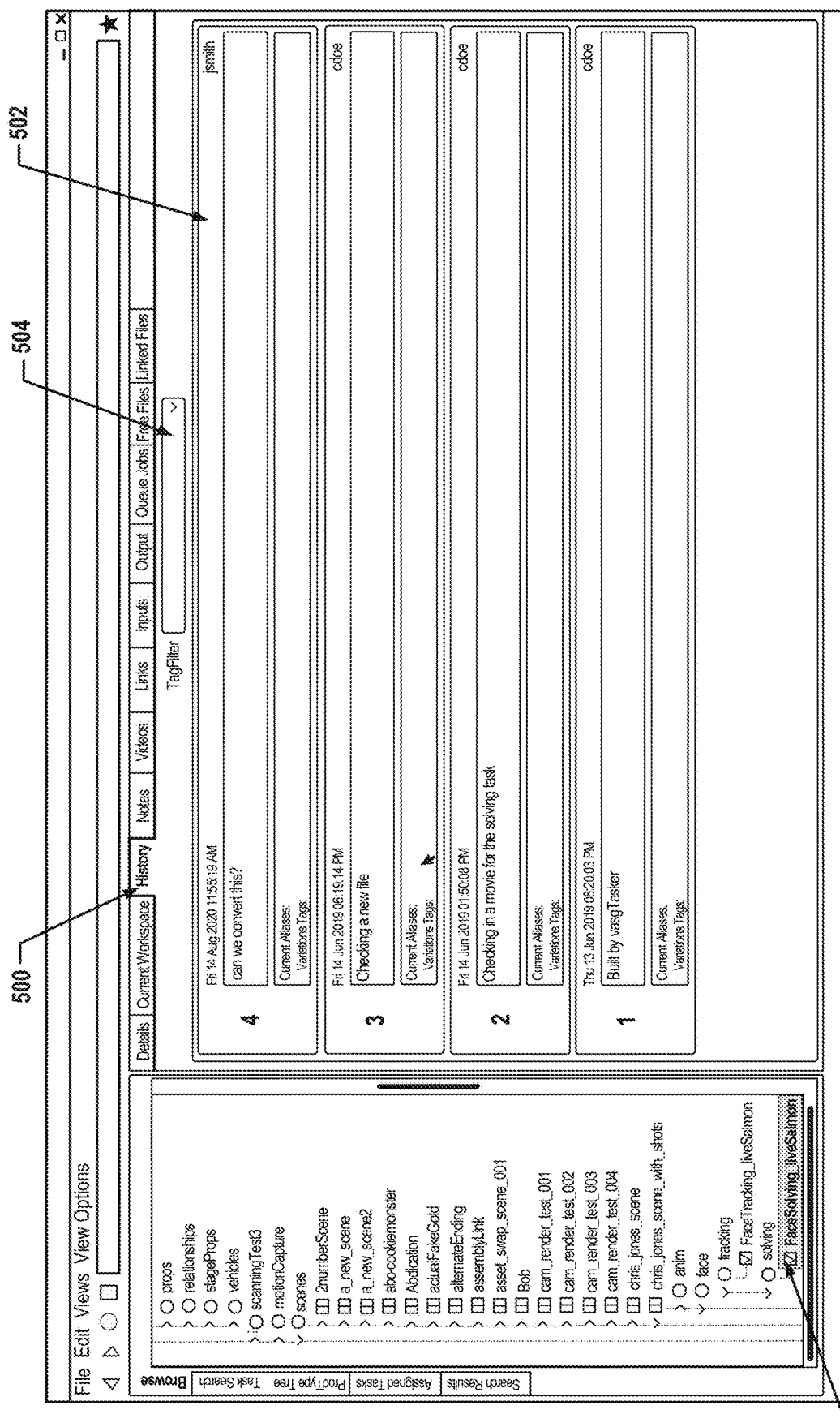
FIG. 5 conceptually illustrates a history view for a task in an asset management system, in accordance with implementations of the disclosure.

FIG. 5 conceptually illustrates a history view for a task in an asset management system, in accordance with implementations of the disclosure.

In the illustrated implementation, the contents of a "History" tab 500 for the task 312 is shown. Broadly speaking, the tab 500 provides views of information relating to each version of the task, include when a given version was created, who created it, any comments, any tags associated to the version, any aliases that currently point to that version, etc.

In some implementations wherein the asset management system is implemented by separate sites a described further below, the history tab 500 can show the history of versions at one's particular site, but also that of other sites. Thus, if one site is out of sync with another site, then it is possible to view what each site considers to be the latest version.

Figure 6A:
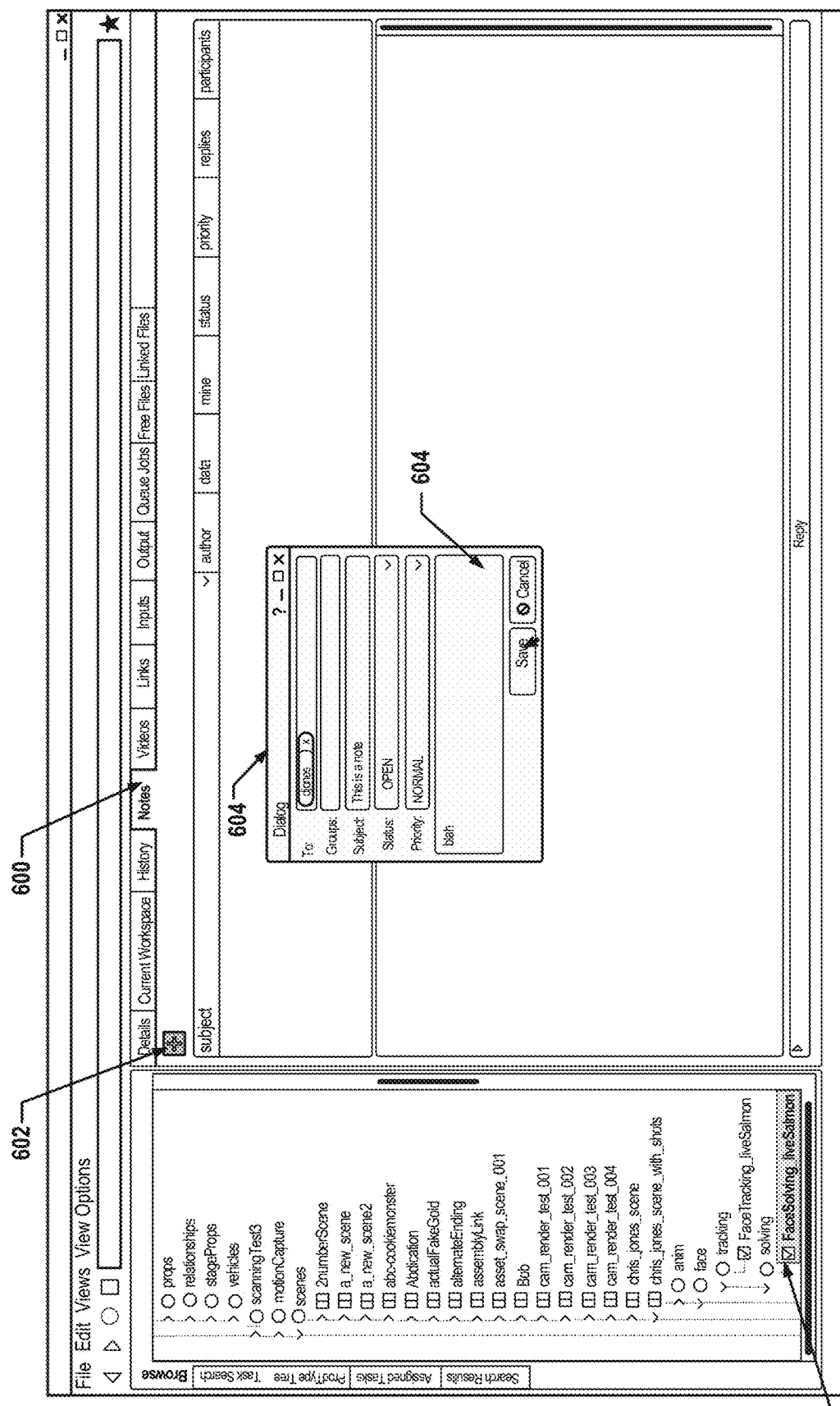
FIG. 6A conceptually illustrates a notes view for a task in an asset management system, in accordance with implementations of the disclosure.

FIG. 6A conceptually illustrates a notes view for a task in an asset management system, in accordance with implementations of the disclosure.

Figure 6B:
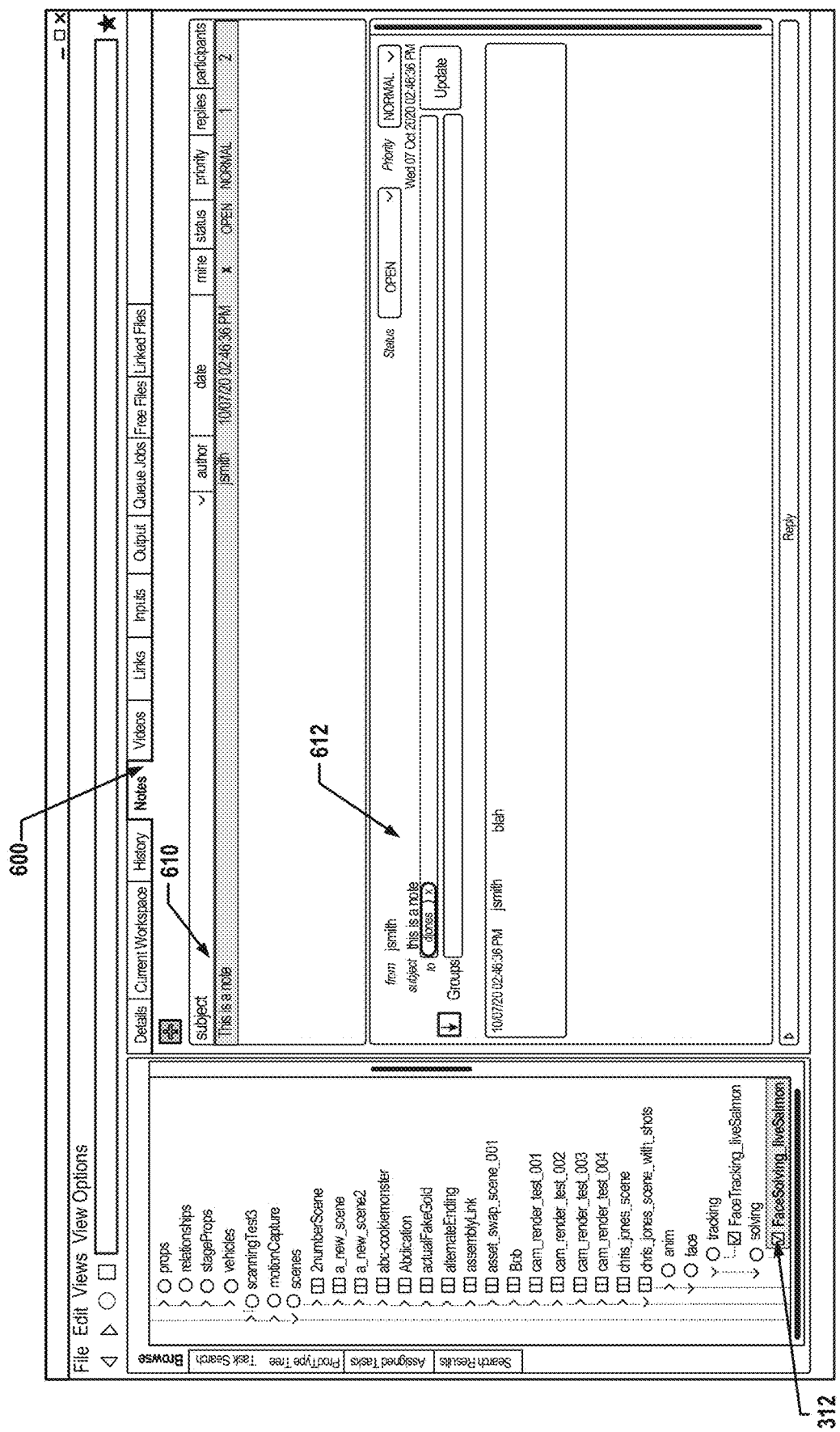
FIG. 6B conceptually illustrates the addition of a new note to a notes view for a task in an asset management system, in accordance with the implementation of FIG. 6A.

In the illustrated implementation, a "Notes" tab 600 for the task 312 is shown. Broadly speaking, this section provides an area for users to post messages or notes which can be addressed to specific users or groups, but also viewed publicly by other users of the system. In the illustrated implementation, a button 602 is selectable to trigger display of a new dialog window 604 that enables a new note to be created. As shown, various input fields are defined within the new dialog window 604, including a "To" field for entry of specific user ID's as recipients of the new note, a "Groups" field for entry of group ID's as recipients of the new note, a "Subject" field for entry of a subject or title for the note, a "Status" setting (e.g. open, complete, etc.), a "Priority" setting (e.g. low, normal, high, etc.), and a text entry field 604 in which text input can be entered to define the body of the note. By hitting the "Save" button in the new dialog window 604, the new note will then be added to the system, as shown at FIG. 6B. In some implementations, saving the new note also sends a message (e.g. via e-mail or other messaging systems) to the recipients of the note informing them they have received a new note, and possibly including the contents of the note, a link to view the note in the asset management system, and/or a link to reply to the note.

FIG. 6B conceptually illustrates the addition of a new note to a notes view for a task in an asset management system, in accordance with the implementation of FIG. 6A.

In the illustrated implementation, the note created via the new dialog window 604 is now posted within the Notes tab 600. As shown, in a notes listing section 610, a listing of any notes associated with the task is displayed, and more specifically the information about the notes, including subject, author, date, status, priority, etc. As shown, the new note has been added to this listing. The new note is currently selected, and accordingly in a detailed view 612 below, the contents of the new note are shown, including the text body of the note and certain editable portions, such as the Status and Priority. As can be seen, the Notes tab 600 provides a section associated to the task 312 that enables conversation threads related to the task to be created and stored. Notes can be addressed to specific users or groups, and replies can be posted forming threads that become part of the history of the task. In some implementations, notes can be further associated to specific versions of the task, so that users can create version-specific notes or view which notes were created for, or in the context of, which versions of the task.

Figure 7:
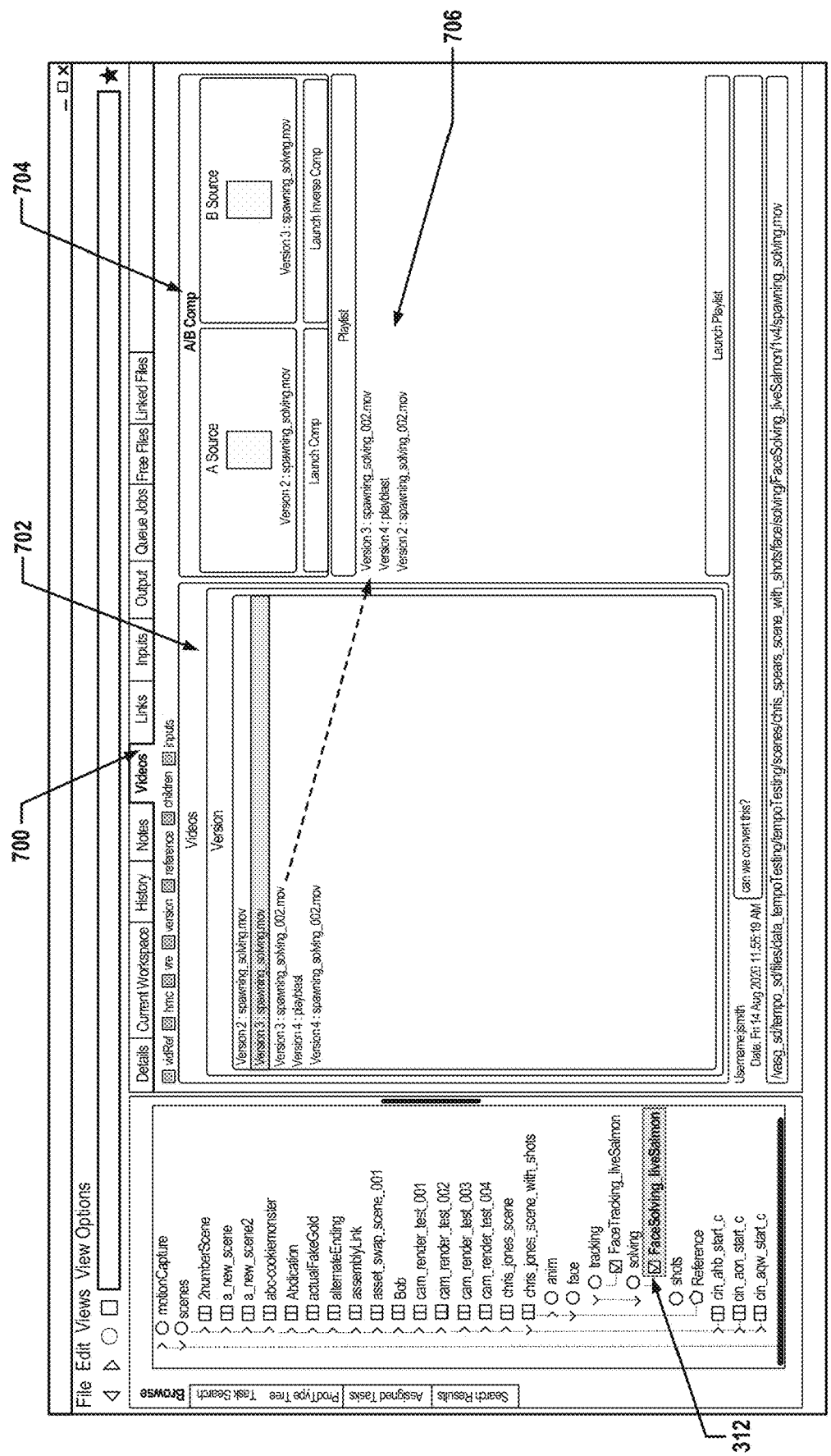
FIG. 7 conceptually illustrates a videos view for a task in an asset management system, in accordance with implementations of the disclosure.

FIG. 7 conceptually illustrates a videos view for a task in an asset management system, in accordance with implementations of the disclosure.

In the illustrated implementation, a "Videos" tab 700 for the task 312 is shown, which provides a section of the interface for viewing videos and launching playback of such videos that are stored in association with the task 312. A listing 702 of the videos that are associated to the task is included, which for each video listed, additionally displays the version of the task to which that video is associated. Thus, a user can easily see the various versions of the task and the videos associated to each version, and thereby see if there are different versions of a given video. In some implementations, the videos are selectable for playback, e.g. double-clicking on a given video in the listing triggers launching of a local video player and initiation of playback of the given video in the local video player.

The videos in the listing 702 can be dragged and dropped to a "Playlist" section 706, to generate a playlist of the videos. Then when the "Launch Playlist" button is selected, the system launches a video player on the user's local machine with the playlist of videos, and may further initiate playback of the playlist of videos, so that the user can view the contents of the videos in succession.

In some implementations, a video comparison tool 704 is provided to enable users to compare two videos. In the illustrated implementation, a first video can be dragged and dropped to the "A Source" section, and a second video can be dragged and dropped to the "B Source" section of the video comparison tool 704. Then, when the "Launch Comp" button is selected, this triggers launching of a local video player capable of simultaneously playing back both videos in a comparison viewing mode.

For example, the comparison viewing mode may consist of both videos being played back overlaid on top of each other in the same window/region with a slider bar to control which video is seen, or rather how much of each video is seen. For example, in some implementations, the slider bar can be configured as a vertical bar that is horizontally slidable, such that to the left of the slider bar one video is displayed whereas to the right of the slider bar the other video is displayed, and thus, sliding the bar all the way to the left or the right reveals one of the videos exclusively, while sliding the bar to the middle reveals half of one video on the left side and half of the other video on the right side. In another example, the comparison viewing mode may consist of both videos being played back side by side. In some implementations, a single time control slider controls the time or time code of the playback for both videos simultaneously in the comparison viewing mode.

Accordingly, users can easily compare different versions of a video that is associated to the task, and view how the video has changed from one version to another. Generally, it is expected that different versions of a given video will have the same time range and time codes, and hence initiating playback simultaneously allows playback of the videos to be synchronized. However, in some cases the time codes may not be the same, such as if a different version of the video was trimmed or lengthened in some way. Therefore, in some implementations, tools are provided to adjust the playback of the videos, e.g. enabling insertion of N blank frames in a given video to enable its starting point to line up with a comparison video that starts N frames earlier.

Figure 8:
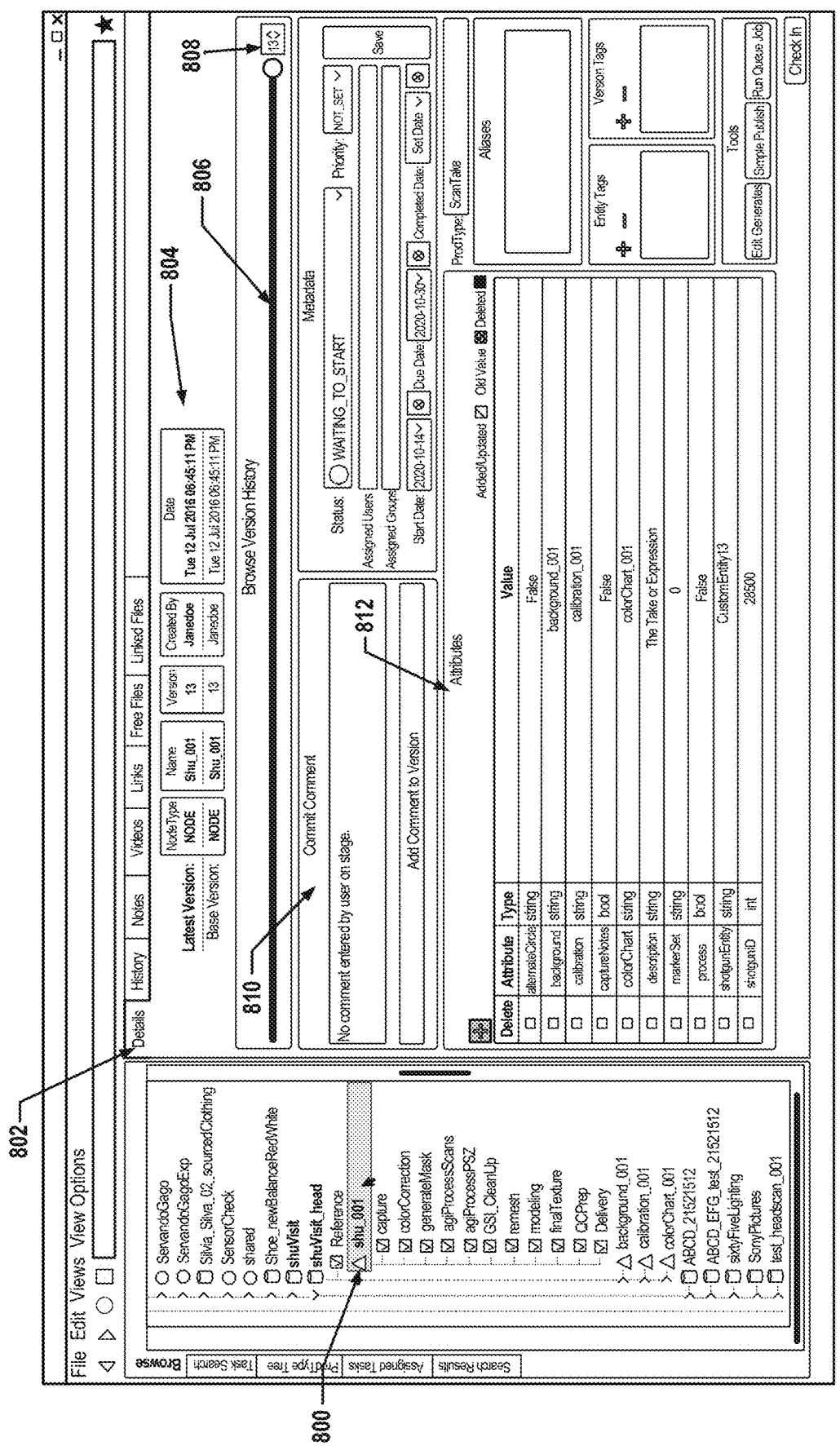
FIG. 8 conceptually illustrates a view of details associated to a node in an asset management system, in accordance with implementations of the disclosure.

FIG. 8 conceptually illustrates a view of details associated to a node in an asset management system, in accordance with implementations of the disclosure.

Another example of a workflow used by animators, provided by way of example without limitation, is a workflow for creating a virtual head, in which an actor's head is scanned and converted into a virtual character head. In the illustrated implementation, a node 800 is shown which is a scantake node representing a single expression being captured. As shown, there are several tasks under the node 800, which are organized in order to illustrate the workflow for accomplishing the goals of the node.

In the illustrated view, the "Details" tab 802 is shown for the node 800, including version information 804, a version slider bar 806, a version selector 808, comments 810, and attributes 812 associated to the node 800. These portions are similar to that described above with reference to task 312, but specifically applied to the node 800 in the present illustrated implementation. Thus, nodes can have various kinds of associated metadata, and further the nodes are versioned in the system with their version history being reviewable if desired.

A new version of node 800 can be generated when changes are made to the details as shown in the illustrated interface view. In some implementations, when a new version of a task under the node 800 is created, then the node 800 is automatically versioned up to reflect the change to the task.

In the illustrated implementation, the attributes 812 can be configured to record any relevant information for the node 800, such as any notes that came from the capture stage, what calibration take was used, what background take is being used, which marker set from the day was being used, a process flag to indicate whether or not this needs to be post-processed, etc.

Figure 9:
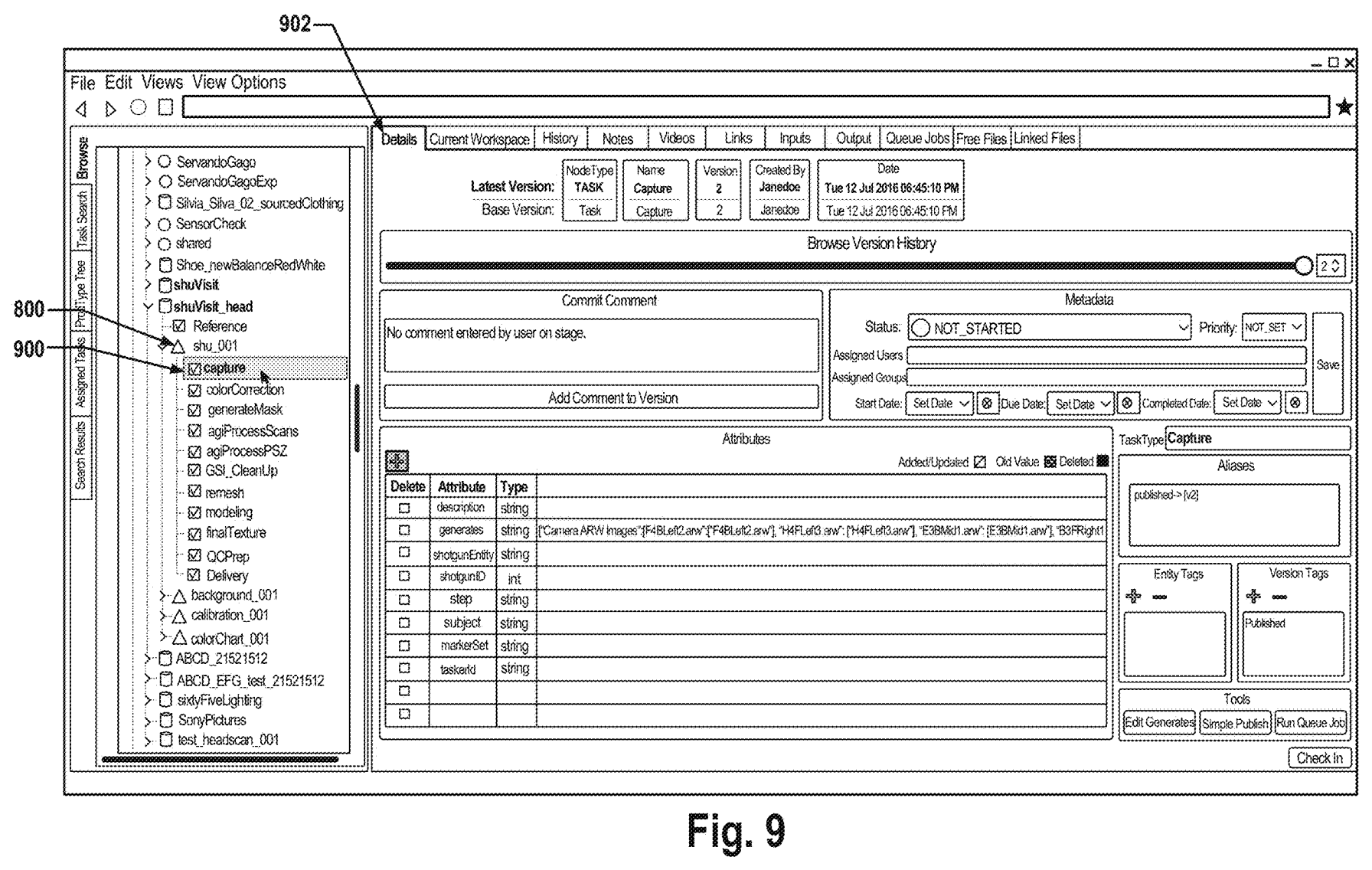

FIG. 9 conceptually illustrates a view of details for a task under a node, in accordance with implementations of the disclosure.

In the illustrated implementation, a "Details" tab 902 for a capture task 900 is displayed, the capture task 900 being included under the node 800. Broadly speaking, the capture task 900 entails the acquisition of image data from a camera rig, and accordingly, this task publishes out captured images (e.g. jpeg, RAW files) that came from the camera rig.

Figure 10:
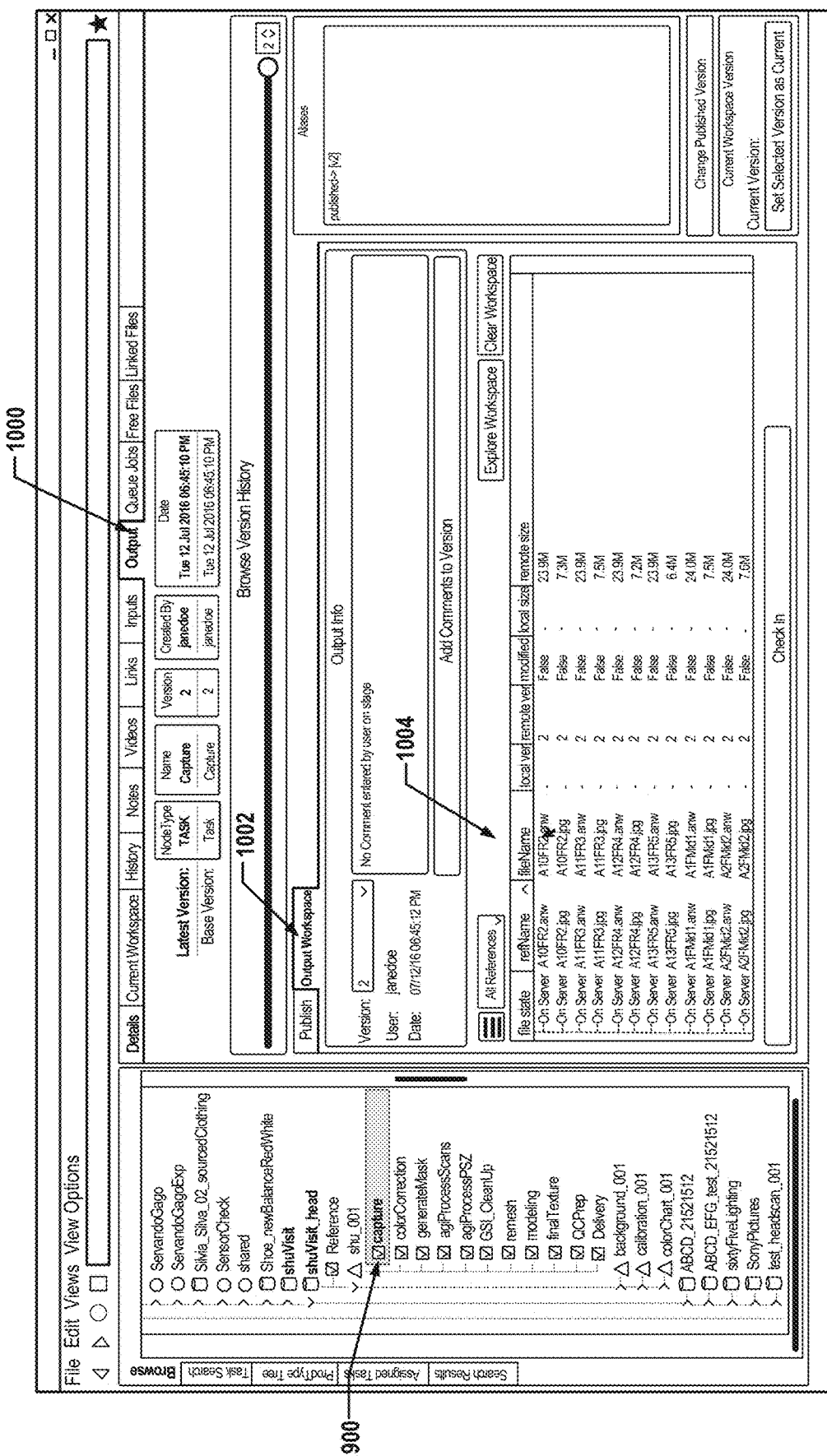
FIG. 10 illustrates an output view for a task, in accordance with the implementation of FIG. 9.

FIG. 10 illustrates an output view for a task, in accordance with the implementation of FIG. 9.

In the illustrated implementation, the "Output" tab 1000 for the capture task 900 is displayed, which includes an Output Workspace 1002. As shown, a listing of output files 1004 is provided, which in the illustrated implementation, includes a plurality of RAW and JPEG image files captured by a camera. It will be appreciated that these output files are the result of performance of the capture task 900.

Figure 11A:
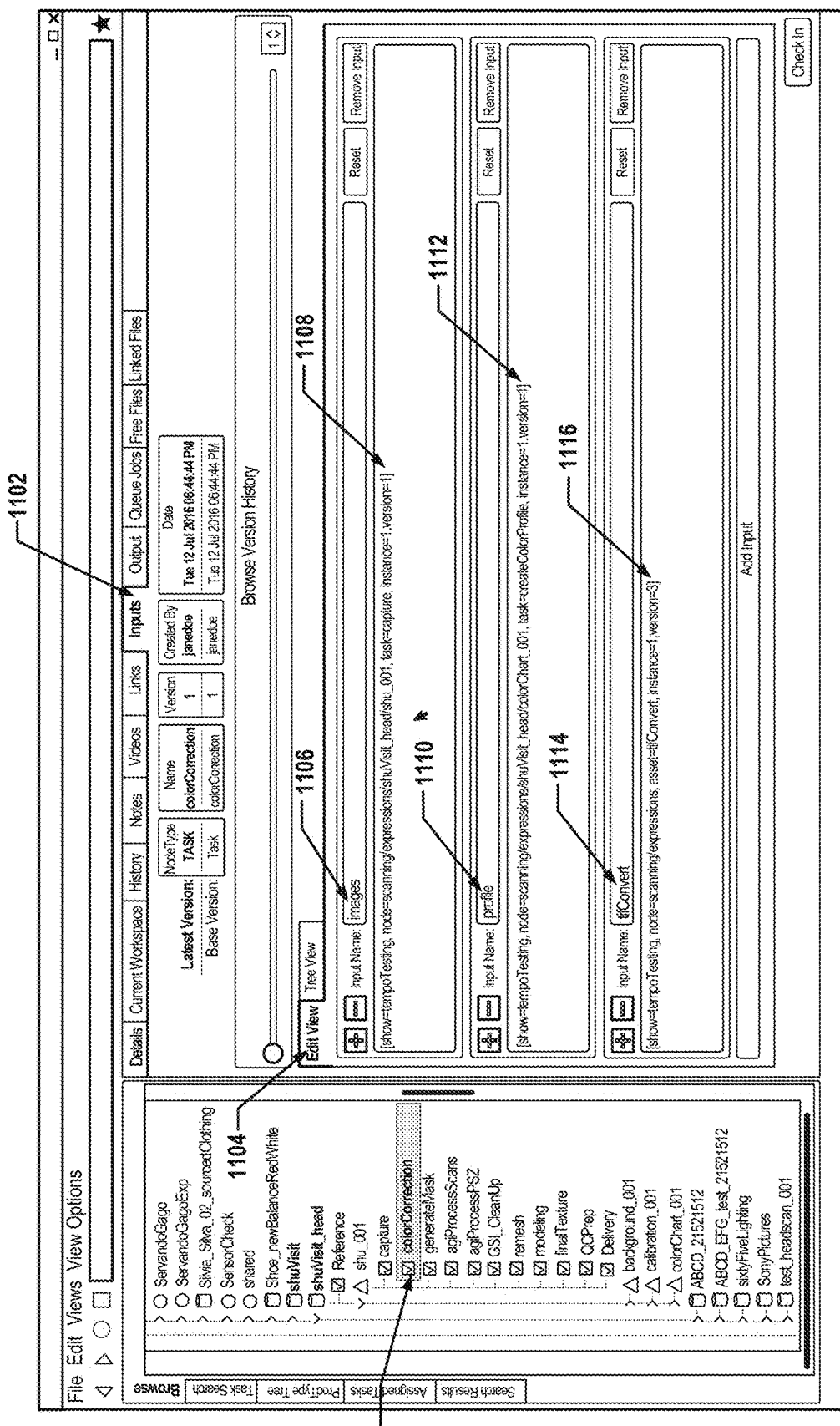
FIG. 11A illustrates a view of inputs for a task, in accordance with the implementation of FIG. 9.

FIG. 11A illustrates a view of inputs for a task, in accordance with the implementation of FIG. 9.

In the illustrated implementation, a color correction task 1100 is selected, which is another task under the node 800, and furthermore is subsequent to the capture task 900 described above. The outputs from the capture task 900 are utilized for the color correction task 1100.

In the illustrated implementation, an "Inputs" tab 1102 is displayed for the color correction task 1100. More specifically, an Edit View 1104 is selected for viewing of inputs for the color correction task 1100. In the Edit View 1104, inputs can be added or removed from the task, as well as edited. In the illustrated implementation, the inputs as shown are defined using an input name and a reference or input string that locates the inputs within the asset management system or otherwise defines the named input. For example, an "images" input 1106 is defined by a reference 1108 which is more specifically a string identifying the capture task (900), as well as its version, whose output images are to be used as an input for the color correction task 1100. Similarly, "profile" input 1110 is defined by a reference 1112 to another node and task, more specifically a color chart node and a create color profile task under the color chart node. A "tifConvert" input 1114 is defined by a reference 1116 to an asset within another node, and more specifically a particular asset "tifConvert" within an "expressions" node.

As demonstrated by the color correction task 1100, a given task can utilize as inputs, files or data from upstream tasks or nodes, and the performance of the given task can generate outputs that may become inputs for downstream tasks or nodes.

Figure 11B:
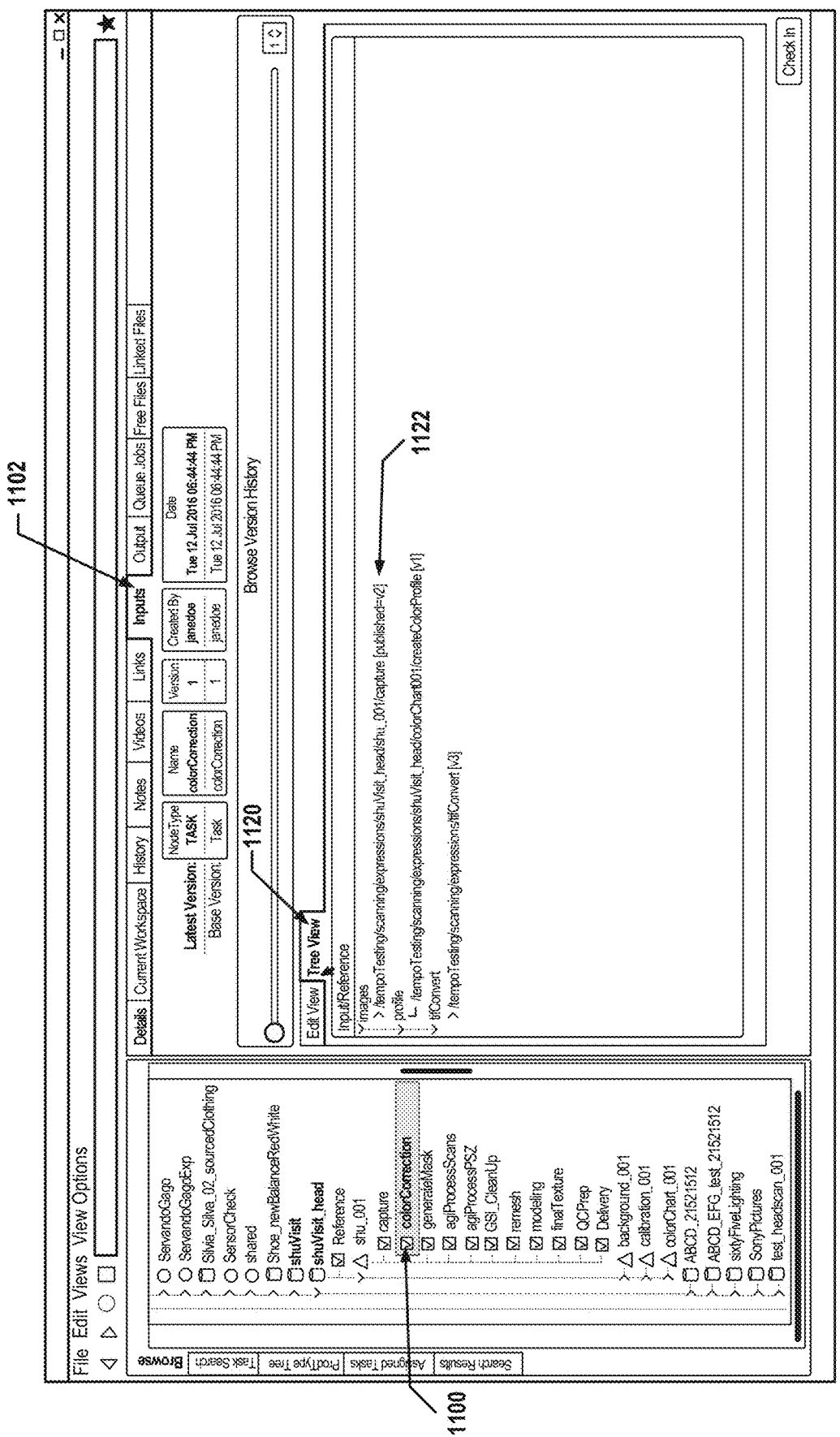
FIG. 11B illustrates a tree view of inputs for a task, in accordance with the implementation of FIG. 11A.

FIG. 11B illustrates a tree view of inputs for a task, in accordance with the implementation of FIG. 11A.

In the illustrated implementation, within the inputs tab 1102 for the color correction task 1100, a tree view 1120 is selected for display of the inputs for the color correction task 1100. This provides an alternative view of the inputs organized into a hierarchical tree structure as shown, with the designated input names at the top level of the tree, and corresponding references/input strings listed below each input name. For example, the "images" input is shown with its corresponding reference 1122 listed under it. Furthermore, a given reference may be expandable to reveal items that are located by the reference, as demonstrated below.

Figure 11C:
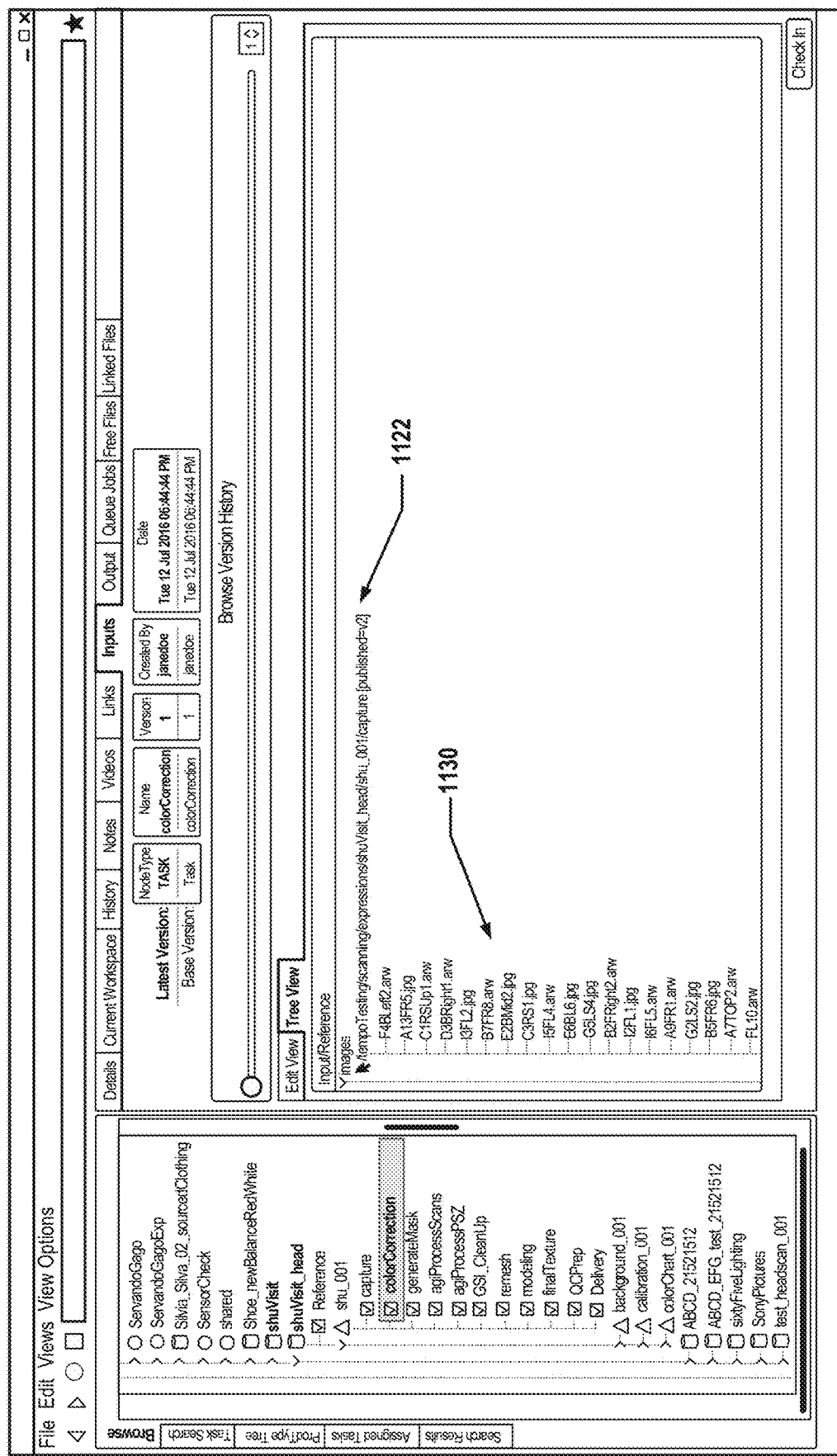
FIG. 11C illustrates a tree view of inputs for a task, in accordance with the implementation of FIG. 11B.

FIG. 11C illustrates a tree view of inputs for a task, in accordance with the implementation of FIG. 11B.

In the illustrated implementation, the reference 1122 has been expanded to reveal the files 1130 that are located by the reference 1122 in the asset management system. As noted, the reference for the images input is to the capture task 900, and accordingly the files 1130 are the output files from the capture task 900, including the RAW and JPEG image files as previously discussed. In this manner, the user is able to view specific files which are located by reference as inputs for the currently selected color correction task 1100.

Figure 12:
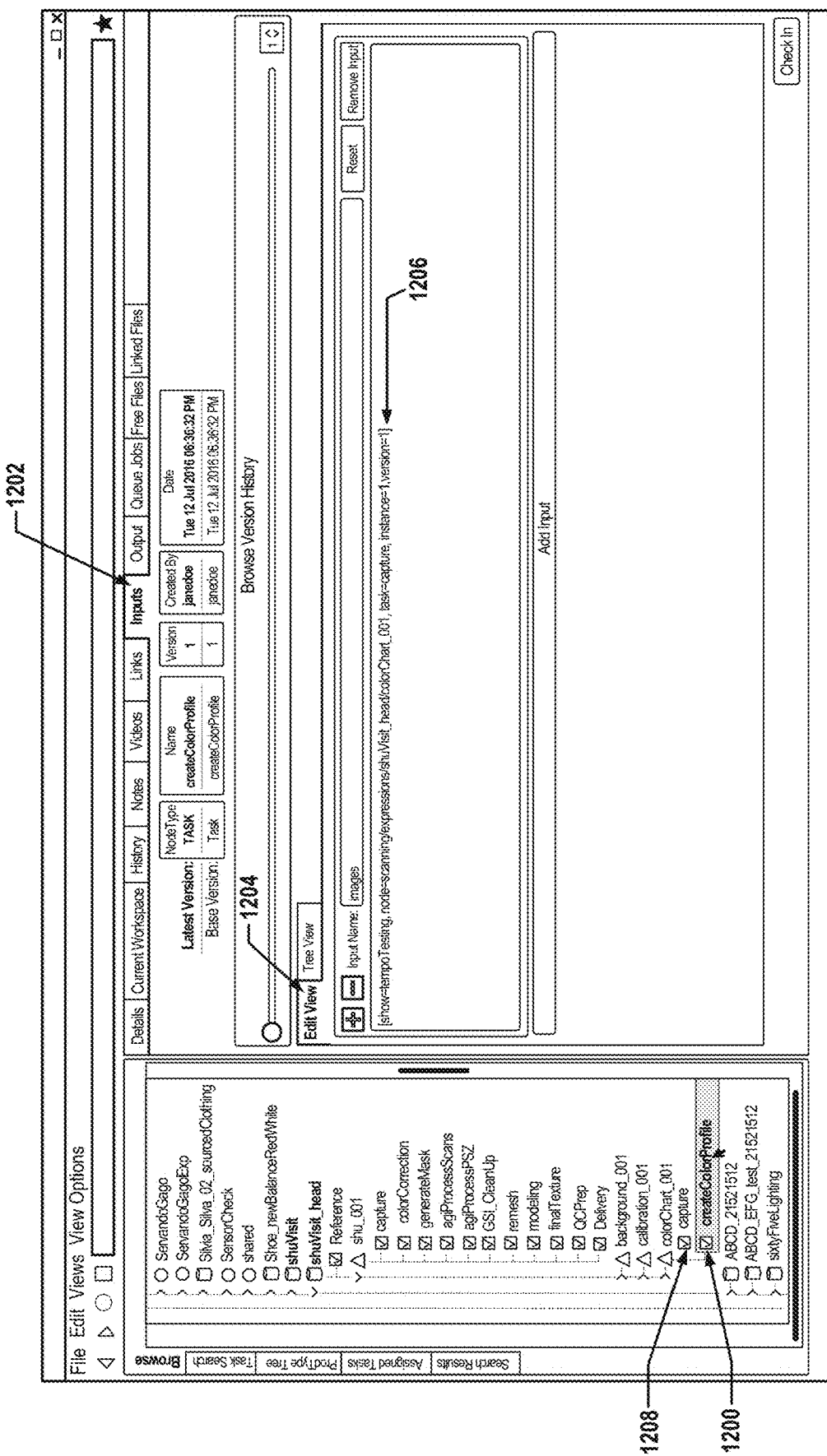
FIG. 12 illustrates a view of inputs for a task, in accordance with implementations of the disclosure.

FIG. 12 illustrates a view of inputs for a task, in accordance with implementations of the disclosure.

In the illustrated implementation, an inputs tab 1202 for a create color profile task 1200 is shown. It is noted that the create color profile task 1200 is identified as an input (see reference 1112) for the above-described color correction task 1100 as previously described. The create color profile task 1200 is itself part of another node as shown. Thus, the input for a given task can be the output from another task in a separate node which is also stored in the asset management system. By storing references to inputs that link to other nodes within the system, it is possible to trace upstream to identify and view the inputs for a given task, while maintaining separation of tasks organizationally within the system. For example, by double-clicking the reference 1112, in some implementations, the system navigates to the location identified by the reference, in this case the create color profile task 1200 as shown by FIG. 12.

The create color profile task 1200 is itself another task that receives inputs from an upstream capture task 1208. In the illustrated implementation, the Inputs tab 1202 for the create color profile task 1200 is shown, and more specifically an Edit View 1204 within the tab 1202. In the illustrated implementation, a reference/input string 1206 that identifies the preceding capture task 1208 is shown as defining the named input "images."

In the presently described implementations of FIGS. 8-12, the capture task 900 is defined for the capture of images, while the color correction task 1100 is defined to color correct all the images. The color profile informs what the actual RGB values of the camera are, to enable white balancing all the images correctly. Hence, the color correction task involves obtaining the color profile from the color profile task 1200, identifying the images from the capture task 900, and using a script from the tifConvert asset (identified by reference 1116) to apply the color profile to all the images to create color-corrected images so that they are all in the same color space.

The software tools that artists are using to accomplish these tasks are in communication with the asset management system, and pulling files out of the system and pushing files into the system. Broadly speaking, the asset management system is managing the flow of the data as tasks are worked on and completed. In the presently described workflow, the system identifies for the color correction task, where to find the captured images and where to find the color profile, and when done, where to write the new color corrected images that were just created, so that other tasks that use those files know where to find them. In this manner, the asset management system is handling the flow and storage of data from task to task, across different software tools that are used to perform the different tasks, so that users engaged in the performance of tasks using such software tools, do not need to be concerned with how or where to store files, or manage versioning of files or tasks, as these are tracked by the asset management system automatically.

In the context of computer graphical asset generation, there are various types of artists, such as designers, animators, lighters, riggers, etc. By utilizing an asset management system in accordance with implementations of the disclosure, such artists are freed to focus on tasks rather than management of files, as the asset management system handles the relationship between files and tasks in the background. The system is configured to integrate with the software tools utilized by the artists, and manages the files for the tools.

Figure 13:
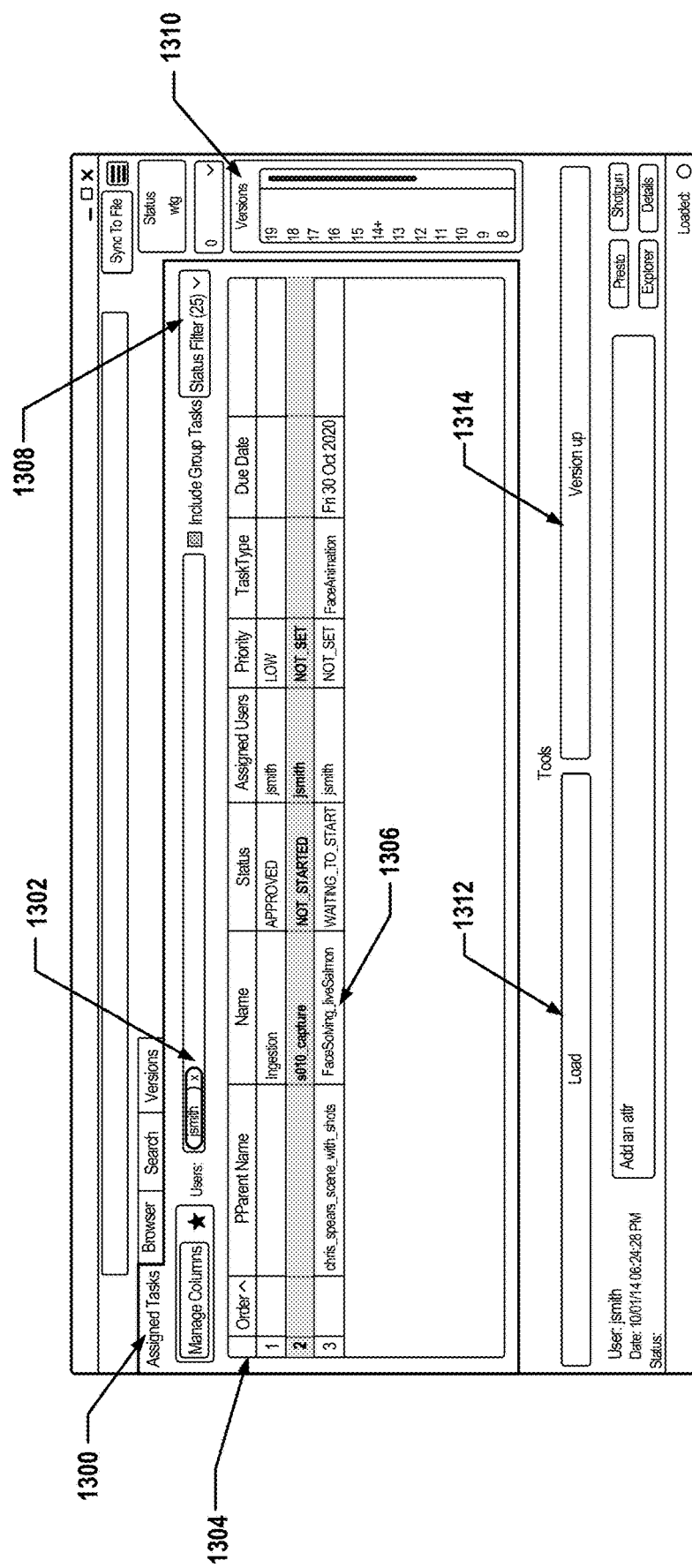
FIG. 13 conceptually illustrates a view of an interface for accessing assigned tasks in an asset management system, in accordance with implementations of the disclosure.

FIG. 13 conceptually illustrates a view of an interface for accessing assigned tasks in an asset management system, in accordance with implementations of the disclosure.

In some implementations, the illustrated view is that of the user task interface 128 previously described, which is executed by a user's local client device 126, and accesses the asset management system. Broadly speaking, the interface provides a task-focused view to enable access to tasks that have been assigned to a given user. In the illustrated implementation, an Assigned Tasks tab 1300 is shown, including a users field 1302 in which a user name can be entered, so that assigned tasks for the entered user name can be retrieved. A status filter 1308 can be set to filter tasks by various criteria, such as priority, due date range, completion status (e.g. not started, x % complete, in-progress, etc.).

The retrieved assigned tasks for the entered user name, subject to any filtering, are provided in the listing 1304. In this way, the user can view just the tasks that have been specifically assigned to them. As shown, various pieces of information about the assigned tasks are provided in the listing 1304, including the task name, status, assigned users, priority, type, and due date. In the illustrated implementation, a face solving task 1306 is shown by way of example. A list of versions 1310 is shown, providing access to each of the versions of a given task that is selected.

The user task interface 128 is configured to integrate with local application 130 on the client device 126, which in some implementations, is a software tool for performance of a task. That is, the user task interface 128 is configured to handle check-out of files from the asset management system for use by the local application 130, and check-in of files from the local application 130 into the asset management system. In some implementations, loading and/or launching of the application 130 with the files for a given task can be handled by the interface 128.

For example, in the illustrated implementation, a user may select the task 1306, select a desired version, and click on a Load button 1312. This will trigger retrieval of the files for the task, and loading of the files into the local application 130 on the client device 126 (and launching of the application 130 if necessary). In some implementations, the local application 130 is a software tool utilized by an artist or other user for performing the task. Upon completion of work on the task, the user may click on the Version Up button 1314 to effect check-in of the files (which can be altered, added to, or deleted from from the checked-out files). This triggers transmittal of the files to the asset management system, creation of a new version of the task in the system, and storage of the files in association with the newly created version of the task.

In some implementations, the user task interface 128 communicates with the local application 130 on the client device 126 through a plug-in API or other communication interface of the application 130. By utilizing a user task interface 128 to provide a more focused graphical front-end to the asset management system, the complexity of file and version management is abstracted away from the artists or users performing the tasks. The listing of tasks assigned to the user can be specifically presented to that user, and a condensed set of information of what the user needs to do their work is provided.

It will be appreciated that specific tools that are specific to the task can be provided through the user task interface. Tasks can have different tools specific to each task. For example, in an animation context, there are different tools for lighting, face solving, rigging, etc. Hence the tools appearing towards the bottom of the interface depend on what task is currently selected, and what software one is currently using. The tools can be application specific, as loading files in one application can be different from another. Accordingly, the interface abstracts away issues of checking out/in files, which files changed/didn't change, whether there are new files, etc. The artist can simply focus on loading their task, performing the task, and versioning up the task. As noted, in some implementations, files that are not changed can be flagged as unchanged, so that no extra copies are made for unchanged files.

Thus, broadly speaking, the workflow for an artist is simplified through the asset management system and user task interface in accordance with implementations of the disclosure. Artists can open their applications on their local computer, find the tasks which they have been assigned, and initiate loading of an assigned task. By default, the latest version of a task may be selected, but the artist can choose other versions if desired. The system automatically copies all the necessary files associated with the task down to the local computer, and when done working, copies files back up to the server, and creates a new version of the task. By treating a group of files as an atomic entity for purposes of versioning (unlike other systems that treat each file individually for versioning), the versioning more closely matches how artists and workflows work. For example, a character model with 8 associated textures might be worked on together, and thus considering multiple files collectively for task-based versioning is more intuitive than existing version control systems that version control individual files.

It will be appreciated that implementations of the present disclosure provide advantages over existing systems in that selection of a task by a user such as an artist is processed without individually selecting files for the task. The views of tasks shown and described herein provide a separate window into listings of files and the status of the files, again without requiring selection of the files specifically. It should be appreciated that task management is decoupled from individual file selections. And thus, files in the asset management viewer implementations are not files being dragged/dropped into a conventional file system viewer, but are files that have been pre-indexed and pre-associated to specific tasks, and this avoids confusion about which files belong to which tasks because they have been pre-indexed and pre-associated to the tasks. The files are being managed specifically for the tasks, thereby providing functionality that is significantly more than a standard file system view. Further, because organization of files is maintained by indexing to the tasks, version control can focus on the files that will be affected by updates without requiring the user to understand how changes could affect other files.

Figure 14:
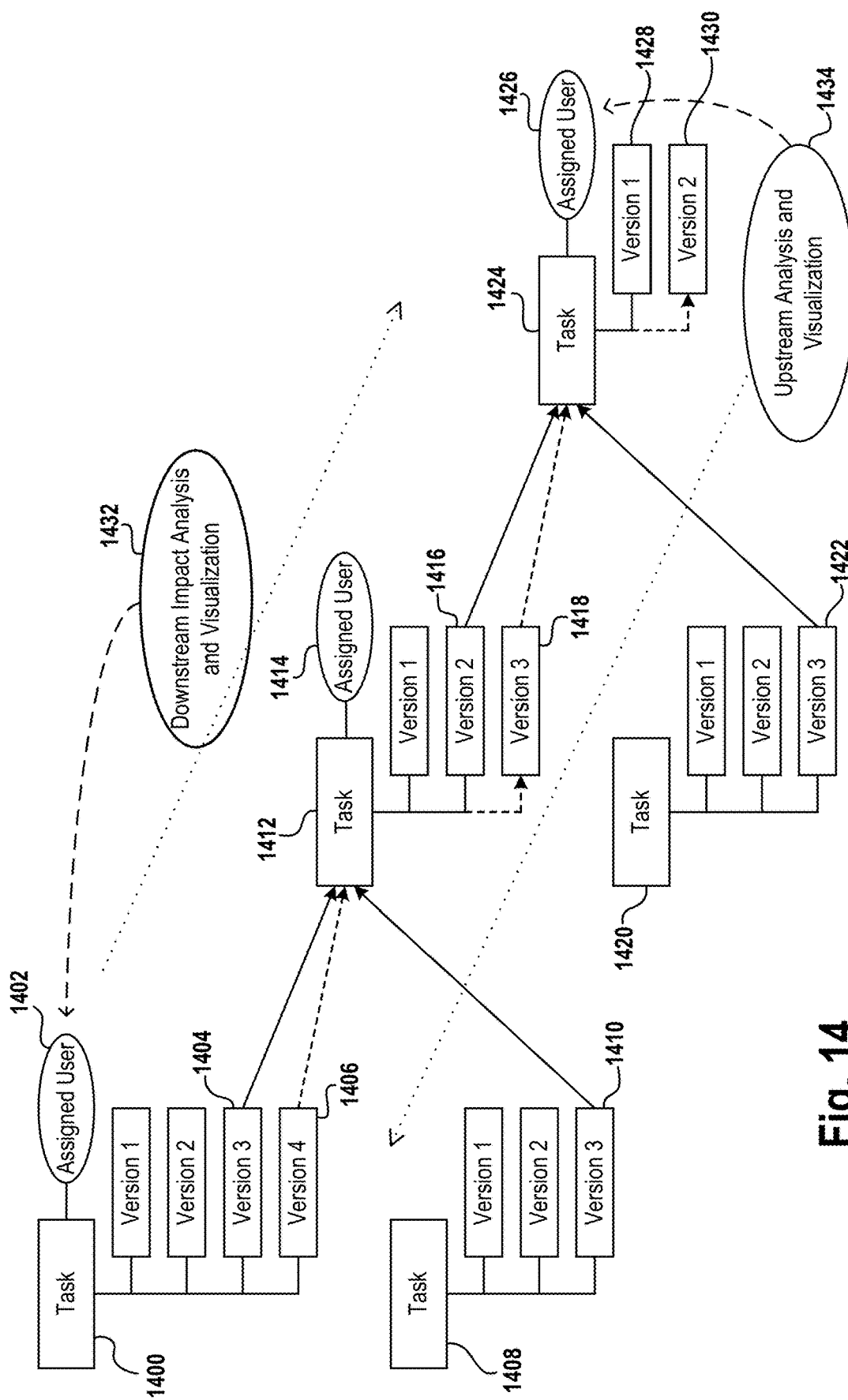
FIG. 14 conceptually illustrates downstream effects of creating a new version of a task, in accordance with implementations of the disclosure.

FIG. 14 conceptually illustrates downstream effects of creating a new version of a task, in accordance with implementations of the disclosure.

It will be appreciated that the interrelated nature of tasks to each other can mean that creating a new version of a given task can have impacts for downstream tasks that utilize the output from the given task as an input. For example, in the illustrated implementation, a task 1400 is assigned to a user 1402. At an initial time, version 3 of the task 1400, shown at ref. 1404, produces an output that feeds into task 1412 which is assigned to user 1414. Another input to task 1412 is from version 3 of a task 1408, shown at ref. 1410. The result of applying version 3 of task 1400 and version 3 of task 1408, yields version 2 of task 1412, shown at ref. 1416. Likewise, the result of applying version 2 of task 1412 as well as version 3 of task 1420 (shown at ref. 1422) as inputs further downstream to a task 1424 assigned to user 1426, produces version 1 of task 1424 (shown at ref. 1428).

At a later time, a new version 4 of task 1400 is created (ref. 1406). The application of the new version 4 of task 1400 in the task 1412 causes a new version 3 of task 1412 (ref. 1418) to be generated. Likewise, version 3 of task 1412 applied into task 1424 results in generation of a new version 2 of task 1424 (ref. 1430). Thus, as can be seen, the creation of version 4 of task 1400 can have effects on downstream tasks, and can result in creation of new versions of downstream tasks. In some implementations, creation of new versions of tasks as a result of an updated version of an upstream task can be automatically performed by the system. In some implementations, creation of new versions of a task is not automatically performed. In some implementations, an assigned user of a downstream task can be informed when there is a new version of an upstream task that flows into their task. For example, the assigned user 1414 of task 1412 can be notified (e.g. via messaging, pop-up notification, automatically created comment, etc.) that there is a new version 4 of the task 1400. In some implementations, an option to incorporate/apply the new version 4 of task 1400 and create a resulting new version of task 1412 is provided, enabling the user 1414 to decide whether to accept the new version of the upstream task 1400. Similarly, the assigned user 1426 can be notified about and/or given the option to incorporate version 3 of task 1412, generating version 2 of task 1424.

As tasks in the asset management system can be modeled as a directed graph, it will be appreciated that an assigned user of a downstream task can traverse upstream to see which tasks feed into their task, and in this manner, can more easily identify changes that impacted their task. In some implementations, the system is configured to provide upstream analysis and visualization 1434 for a downstream user, such as the assigned user 1426 of task 1424. Such upstream analysis and visualization may identify tasks and changes to tasks that occurred upstream which resulted in changes to the downstream task.

In some implementations, the system is configured to provide downstream impact analysis and visualization 1432 for an upstream user, such as the assigned user 1402 of task 1400. Such downstream analysis and visualization may identify how downstream tasks will be affected by changes made in a new version of the upstream task. For example, analysis can be performed to identify impacts to a downstream task that exceed a predefined threshold, and these can be identified to the user 1402. In some implementations, the visualization can take the form of a graph, chart or other graphical expression of the impact of the changes. In some implementations, a before and after visualization of the impact of the new version to a downstream task can be presented to the user 1402. For example, in the case of an impact to an image or animation, the current version of the image or animation can be presented along with a new version as would result from the impact of the new version of the upstream task. In some implementations, downstream impact visualization tools can be provided at check-in, which may provide any of the presently described impact analysis or visualization. In some implementations, such tools can enable analysis and/or visualization of the impact to particular aspects or properties of downstream tasks. For example, in the case of downstream rendering of an asset or animation, there can be different buttons to show a shadow impact, lighting impact, artifacting impact, etc.

Figure 15:
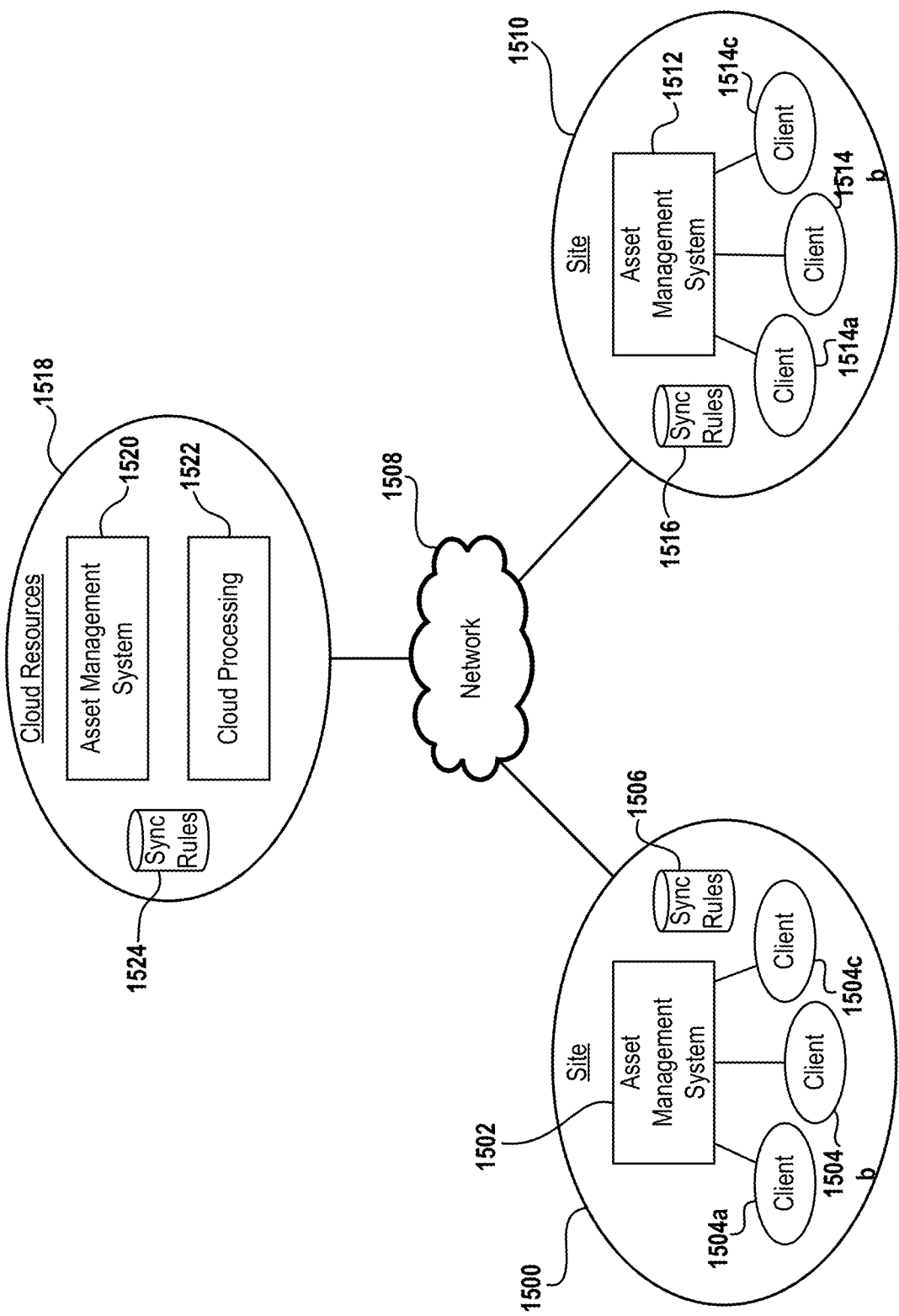
FIG. 15 conceptually illustrates a distributed asset management system, in accordance with implementations of the disclosure.

FIG. 15 conceptually illustrates a distributed asset management system, in accordance with implementations of the disclosure.

Broadly speaking, in the illustrated implementation, there are multiple instances of an asset management system implemented at geographically distinct sites (e.g. different cities, countries), which synchronize to each other to enable distributed work to take place on the same project, including the same set of nodes and tasks. For example, at a site 1500, there is an asset management system 1502 that serves clients 1504*a*, 1504*b*, and 1504*c* (e.g. over a local network). Similarly, at another site 1510, there is an asset management system 1512 that serves clients 1514*a*, 1514*b*, and 1514*c* (e.g. over a local network). The different sites communicate with each other over network 1508, that is, the asset management system 1502 and the asset management system 1512 communicate over network 1508, which can include any of a variety of networks including the Internet. Each asset management system maintains its own local copy of the assets/files and metadata, including organization and version control into nodes/tasks as described above, and these assets are synchronized across the sites according to a common set of synchronization rules. In the illustrated implementation, the asset management system 1502 at site 1500 accesses synchronization rules 1506, and the asset management system 1512 at site 1510 accesses synchronization rules 1516, which provide common rules for synchronization of the asset management systems.

Accordingly, a distinguishing feature of implementations of the present disclosure is the distributed nature of asset management. Existing studios typically have a single point of entry to a centralized file server system. However, in implementations of the present disclosure, by using a distributed asset management approach, work sharing on common projects across different geographical locations is better accommodated while improving local performance as assets are synchronized across sites and locally accessible.

In some implementations, a cloud-hosted instance of the asset management system can be implemented. For example, in the illustrated implementation, asset management system 1520 is implemented on cloud resources 1518, which also accesses the common synchronization rules 1524. The asset management system 1520 thus stores its own unique copy of assets and metadata in the cloud so they can be easily accessed by cloud resources, e.g. to perform cloud processing 1522. It will be appreciated that as cloud processing 1522 is performed on existing assets/metadata, then the results of such cloud processing (e.g. file or metadata changes, new entities, new assets, new versions of nodes/tasks, etc.) are additionally stored to the system and shared to each of the asset management systems 1502 and 1512 at sites 1500 and 1510.

In a distributed asset management system as presently described, conflict resolution is a significant challenge, as conflict resolution for graphical-type assets is more difficult than other types of files, such as source code. It is fairly easy to merge text source code, but much harder to merge binary assets, and thus different methods for conflict resolution are needed. In some implementations, if two users each make a new version of a task, and those versions are atomic, then both versions can exist in the system, with the ability to go back and choose which version to use for downstream purposes. However, some forms of metadata are mergeable, and thus for certain metadata, a merge process can be applied to incorporate changes from both versions into a single version. Conflict resolution processes can apply when there has been a disconnect (e.g. loss of network communication for an hour or a day) between sites, and when there is progress made at both sites during the disconnect. Broadly speaking, a common set of rules can be applied, including who has priority in specific conflicts, what sorts of metadata can be merged successfully, what sorts of metadata can be changed by one site but not another, what changes are acceptable in view of other changes. Generally, the goal in such rules is to minimize the amount of changes that are thrown away, so as to reflect as accurately as possible contributions from both sites in a coherent fashion. While conflict resolution is described in the context of two sites by way of example without limitation, it will be appreciated that in other implementations, the principles of conflict resolution described herein can be applied to instances of three or more sites.

Figure 16:
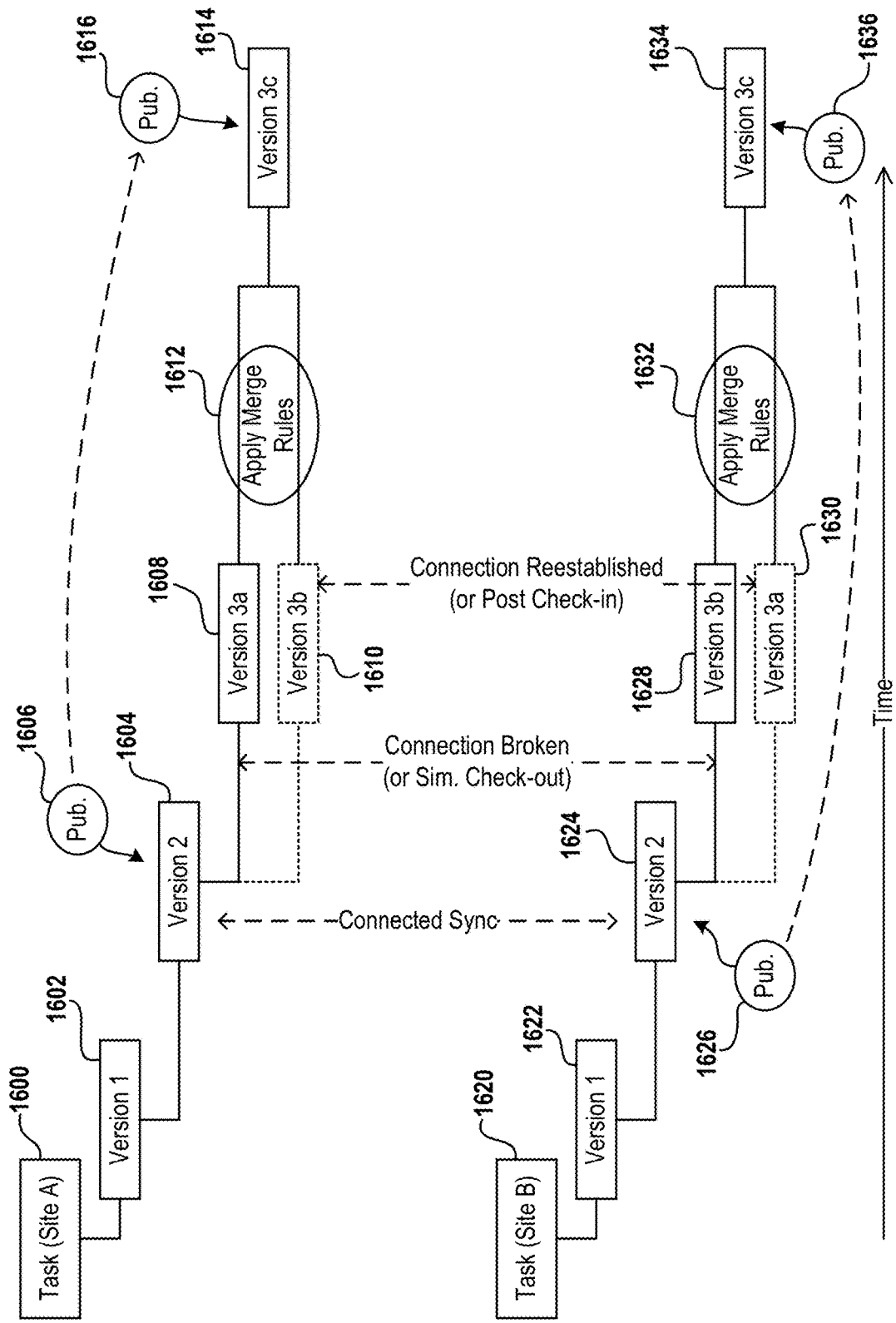
FIG. 16 conceptually illustrates merging of different versions of a task, in accordance with implementations of the disclosure.

FIG. 16 conceptually illustrates merging of different versions of a task, in accordance with implementations of the disclosure.

In the illustrated implementation, a given task is shared across asset management systems at different sites, conceptually shown as task 1600 in a first asset management system at a first site A, and as task 1620 in a second asset management system at a second site. A version 1 (ref. 1602) of the task 1600 at the first site is synchronized with version 1 (ref. 1622) of the task 1620 at the second site B. When the different sites are maintaining synchronization with each other, then new versions are added and shared across the sites. In some implementations, if work proceeds from the latest version, then versioning up proceeds in a linear fashion, with a single successive version generated from a preceding version of the task and the sites in synchronization. For example, in the illustrated implementation, version 2 (ref. 1604) of task 1600 may be created at the first site, and then shared and stored to the second site as version 2 (ref. 1624) of task 1620.

When the sites are connected, then the asset management systems are in communication with each other to enable synchronization of tasks. For example, when a task is checked-out by a first user at a first site, then the check-out event can be communicated to the second site, so that the currently checked-out status of the task at the first site is known to the asset management system of the second site. In some implementations, if a second user accesses or attempts to check-out the same task at the second site, then they are notified that the task is currently checked-out by the first user at the first site. In some implementations, the second user at the second site is prevented from checking out the same task until the first user at the first site has checked-in the task. Whereas in other implementations, the second user at the second site is able to check-out the same task, but with the knowledge that the task is currently checked-out at the first site. In some implementations, an option to message or otherwise communicate with the first user at the first site (that checked-out the task) is provided to the second user.

It will be appreciated that in some implementations, the foregoing is applied in the context of specific versions of the task. That is, the second user can be notified that the first user has checked-out a given version of the task, which may or may not prevent the first user from checking out the same version of the task.

As noted, under ideal conditions, data is continually being shared between the sites, so that the two sites are synchronized. For example, when recording a change to metadata, the change is made to the latest version that is shared across both sites, so that changes are essentially stacked on top of each other. However, if the connection/communication between two sites is lost for a time, and both sites wish to make a change to the same entity, then instead of stacking changes, the result is a fork.

For example, with continued reference to FIG. 16, version 2 (refs. 1604 and 1624) of the task is the latest version and furthermore can be designated as the default or published version by a pointer 1606 in the first asset management system at the first site, and a corresponding pointer 1626 in the second asset management system at the second site.

However, if the connection between the two sites is lost, then work on the same task may proceed independently at each site, resulting in creation of different ensuing versions of the task. That is, version 2 (ref. 1604) may be checked-out at the first site, and independently, version 2 (ref. 1624) is checked-out at the second site. Check-in at both sites results in the creation of a version 3a (ref. 1608) at the first site, and a version 3b (ref. 1628) at the second site, which are different from each other.

When the two sites are back in sync, they share with each other what has happened in the intervening period of disconnection. That is, version 3a is copied to the second site (ref. 1630) and version 3b is copied to the first site (ref. 1620), so that both systems now have both versions that were created while the sites were disconnected. In some implementations, then both sites use the same rules to determine the same outcome, which may entail selection of one of the versions and/or merging the changes to produce a single coherent result, and so achieve synchronization and agreement about the latest published version going forward.

Broadly speaking, entities in asset management systems in accordance with implementations of the disclosure are versioned atomically, as previously discussed. Accordingly, when multiple child versions have been created from the same parent version during a period of disconnection between sites, such as versions 3a and 3b in the illustrated implementation, then in some implementations, both child versions can be retained/stored but one version is selected to be the default (or published/official/prioritized) latest version based on predefined rules or criteria. In some implementations, a prioritization is set so that one site has priority over the other with respect to changes or new versions, and therefore its version is automatically selected as the default latest version. In some implementations, various considerations may be used to determine which child version is selected as the default version, such as time stamps associated to the versions (e.g. check-out or check-in time stamps, time-stamps of changes within each version), types of changes made, the extent of changes made, etc. It will be appreciated that upon selection of one of the versions, then the default/published pointer can be accordingly updated at each site, so that if for example, version 3a is selected, then the pointer 1606 is updated to point to version 3a (ref. 1608) in the first asset management system, and the pointer 1626 is updated to point to version 3a (ref. 1630) in the second asset management system.

In some implementations, rather than picking a single version to have priority, the systems of each site perform a merge process according to common predefined merge rules, conceptually shown at ref. 1612 for the first site and ref. 1632 for the second site. In some implementations, each site has a priority with respect to the task, such that changes by the higher priority site take precedence over changes by the lower priority site. For example, if the first site has priority over the second site, then in some implementations, changes made by the first site are accepted, and then any changes made by the second site that do not conflict with those made by the first site can be implemented. In the illustrated implementation, this can entail determining and comparing the changes to the parent version 2 that were made in each of versions 3a and 3b, discarding any changes made by version 3b that would conflict with those of version 3a, and implementing the remaining changes from both versions to generate version 3c (ref. 1614 at the first site; ref. 1634 at the second site).

By way of example without limitation, if the first site made changes in the assignment of users (e.g. added a new user), then any changes to the assignment of users made by the second site during that time period of disconnection would be ignored or discarded. However, if the first site did not change start date, then if someone at the second site changed the start date, then that change to start date would be accepted and become part of version 3c. Thus, as presently described, the site with higher priority will take precedence with respect to changes implemented by competing versions of the task.

It will be appreciated that the priority levels of the different sites can be set for individual tasks or nodes, and may propagate to sub-nodes/sub-tasks depending on the hierarchical level at which the priority level is set. For example, in a visual media context, top/upper/high level nodes may represent several media properties (e.g. shows, video games, etc.), and for each media property, priority levels of the sites in the distributed asset management system are set. This can set the default priority levels of the sites for all sub-nodes or tasks within a given show. However, individual nodes or tasks can have a separate override priority setting that enables an individual node or task to have different priority settings. For example, a given media property may be primarily based out of a first site as opposed to a second site, and therefore the priority levels for the given media property are configured to prioritize the first site over the second site. However, the second site is leading and handling a specific task or group of tasks, and therefore for those specific tasks, the default priority levels are overridden to instead prioritize the second site over the first site.

While conflict resolution is described with reference to versions of tasks specifically, it will be appreciated that the principles for conflict resolution between sites described herein can be applied to nodes, tasks, assets, their included/associated metadata, or metadata generally in accordance with implementations of the disclosure.

In some implementations, different portions of data within competing versions of an entity are handled differently for purposes of merging to form a single version. For example, for some portions of data, changes by one site are prioritized while those from another are discarded. Whereas for other portions of data, changes are merged according to predefined rules.

Figure 17:
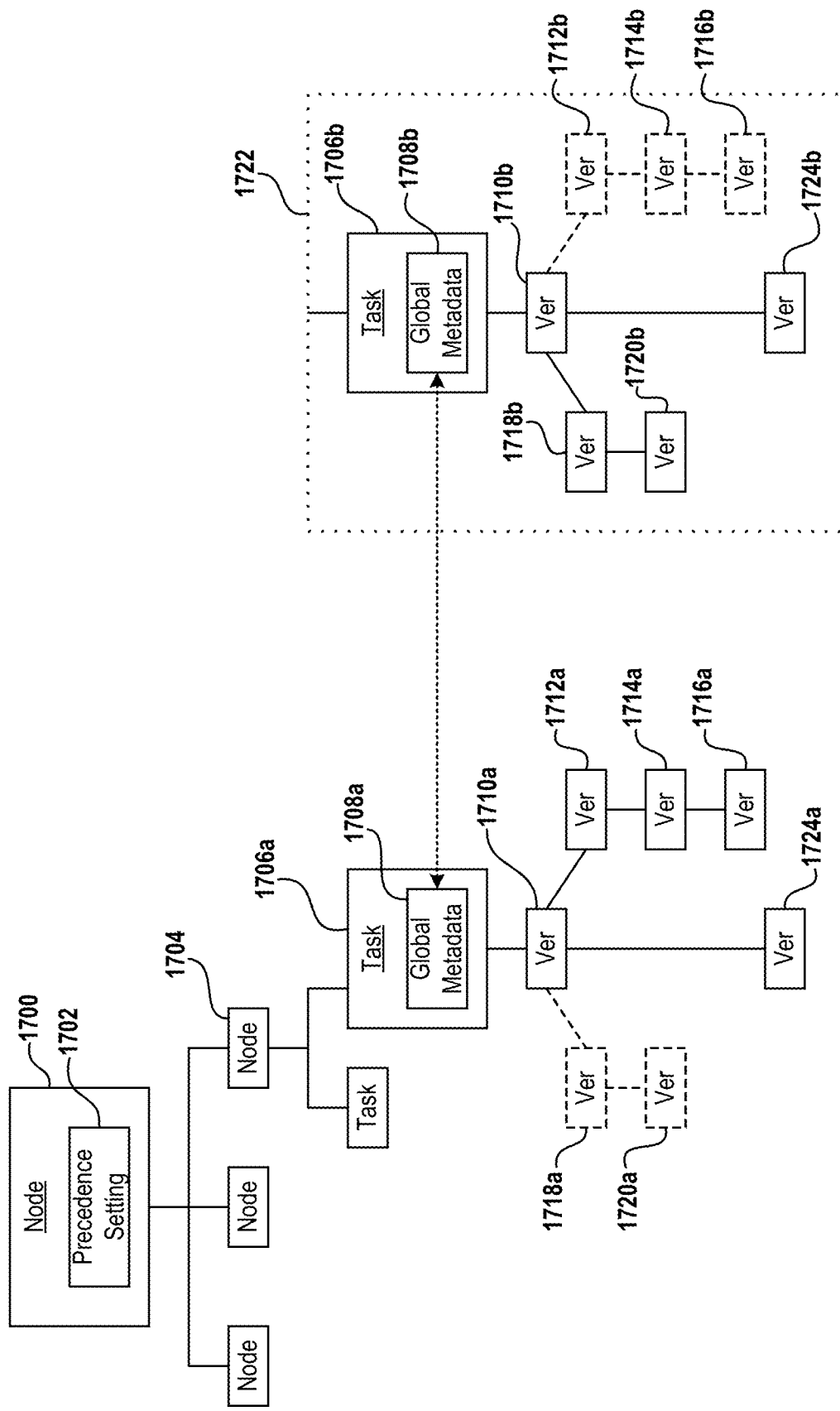
FIG. 17 conceptually illustrates handling of branching of versions of a task, in accordance with implementations of the disclosure.

FIG. 17 conceptually illustrates handling of branching of versions of a task, in accordance with implementations of the disclosure.

In the illustrated implementation, a hierarchy of a node 1700 of an asset management system implemented at a local site is shown. The node 1700 is hierarchically arranged to include several sub-nodes including node 1704. Node 1704 further includes multiple tasks including a task 1706*a*. At a remote site 1722, a corresponding asset management system is implemented having a corresponding task 1706*b*. The asset management systems of the local and remote sites are configured to sync to each other, and accordingly the corresponding tasks 1706*a* and 1706*b* are synchronized with each other. However, synchronization is not necessarily continuous, and it is possible for both sites to simultaneously work on the same task, as each site keeps its own local copy of the nodes and tasks stored to their respective asset management systems.

For example, in the illustrated implementation, a development branch from the version 1710*a* of task 1706*a* is created at the local site, consisting of versions 1712*a*, 1714*a*, and 1716*a*. Meanwhile, at the remote site 1722, another development branch consisting of versions 1718*b* and 1720*b* is created. During synchronization both development branches are copied to the other site, as indicated in the illustrated implementation, by versions 1718*a* a 1720*a* which correspond to 1718*b* and 1720*b*, and versions 1712*b*, 1714*b*, and 1716*b* which correspond to versions 1712*a*, 1714*a*, and 1716*a*.

In some implementations, synchronization of the different sites is triggered by a command, performed at periodic intervals, or triggered by an event such as a request to merge to the mainline branch, which consists of the version 1710*a* at the local site and 1710*b* at the remote site 1722.

In some implementations, the two development branches are merged according to predefined merge rules. In some implementations, one site takes precedence over the other site as defined by a precedence setting that applies to the task 1706*a*. In some implementations, the precedence setting can exist in the hierarchical structure at a higher level node or entity, that then applies by default to all sub-entities. Accordingly, if no precedence setting is stored for the task 1706*a*, then the precedence setting is found by traversing up the hierarchical tree until one is found.

In the illustrated implementation, the applicable precedence setting 1702 is stored with node 1700. Thus, by traversing up the hierarchy from the task 1706*a* to node 1700, then the precedence setting 1702 is found and applied to the merge process of the development branches. It will be appreciated that such a precedence setting is applied as a default for sub-entities of the node 1700. However, the precedence setting for any individual entity can be set to override the default that would otherwise be inherited from a higher level entity, and such would then flow to become the default for any downstream sub-entities.

The precedence setting can define which site's changes have priority for which data. For example, some data or assets may be non-mergeable, and therefore the precedence setting defines which site's data or assets will be used to the exclusion of the other site's. However, for data that is mergeable, then the precedence setting may define the priorities of the different sites, such as accepting one site's changes first, and then the other site's changes for any fields or other data that wasn't altered by the first site's changes. In some implementations, every site has a priority versus every other site, so that no two sites have equal priority with respect to a given data item. Whereas in other implementations, it is possible for two sites to have equal priority. In some implementations, if both sites have equal priority for a given data item, then the change which occurred earlier in time is accepted to the exclusion of the other. In the illustrated implementation, the result of merging the branches is the creation of version 1724*a* at the local site, and version 1724*b* at the remote site 1722. Accordingly, the mainline branch of the version history for the task 1706*a* consists of versions 1710*a* and 1724*a*.

In some implementations, there is global metadata 1708*a* associated with the task 1706*a*, and corresponding global metadata 1708*b* associated with the task 1706*b* at the remote site 1722. Global metadata is shared across the sites, and applies to all versions of the task. Accordingly, changes to the global metadata can in some implementations, trigger updates to be sent to the other site so as to maintain synchronization of the global metadata. In the case of conflicts or simultaneous changes (for example, as might occur during disconnection of the sites), there can be prioritization according to precedence setting similar to that described above.

Implementations of the present disclosure can be utilized in the development of, or in conjunction with, or included as part of, a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 or Playstation® 5 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 18A:
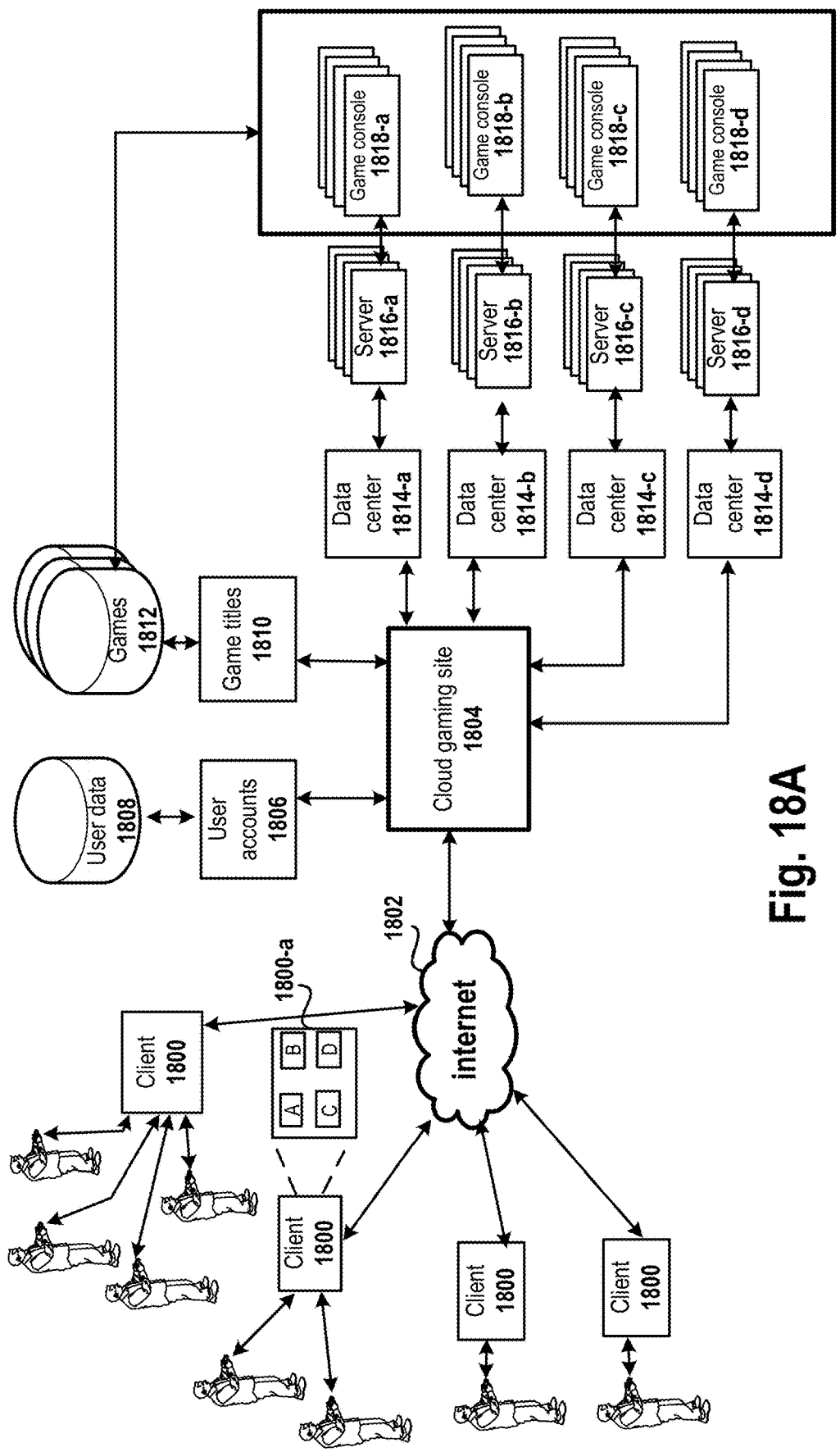
FIG. 18A illustrates an exemplary system used to load game files for a game available through a cloud gaming site, in accordance with implementations of the disclosure.

FIG. 18A illustrates an exemplary system used to load game files for a game available through a cloud gaming site, in accordance with implementations of the disclosure.

The system includes a plurality of client devices 1800 that are communicatively connected to the cloud gaming site 1804 over a network 1802, which can include a LAN, wired, wireless, cellular (e.g. 4G, 5G, etc.), or any other type of data network, including the Internet. When a request to access the cloud gaming site 1804 is received from a client device 1800, the cloud gaming site 1804 accesses user account information 1806 stored in a user data store 1808 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 1810 to identify the game titles that are available at the game cloud site for the user account initiating the request. The game titles data store 1810, in turn, interacts with a games database 1812 to obtain the game titles for all the games that are available for the cloud gaming site. As new games are introduced, the games database 1812 will be updated with the game code and the game titles data store 1810 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 1800-*a*, as shown in FIG. 18A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 18B:
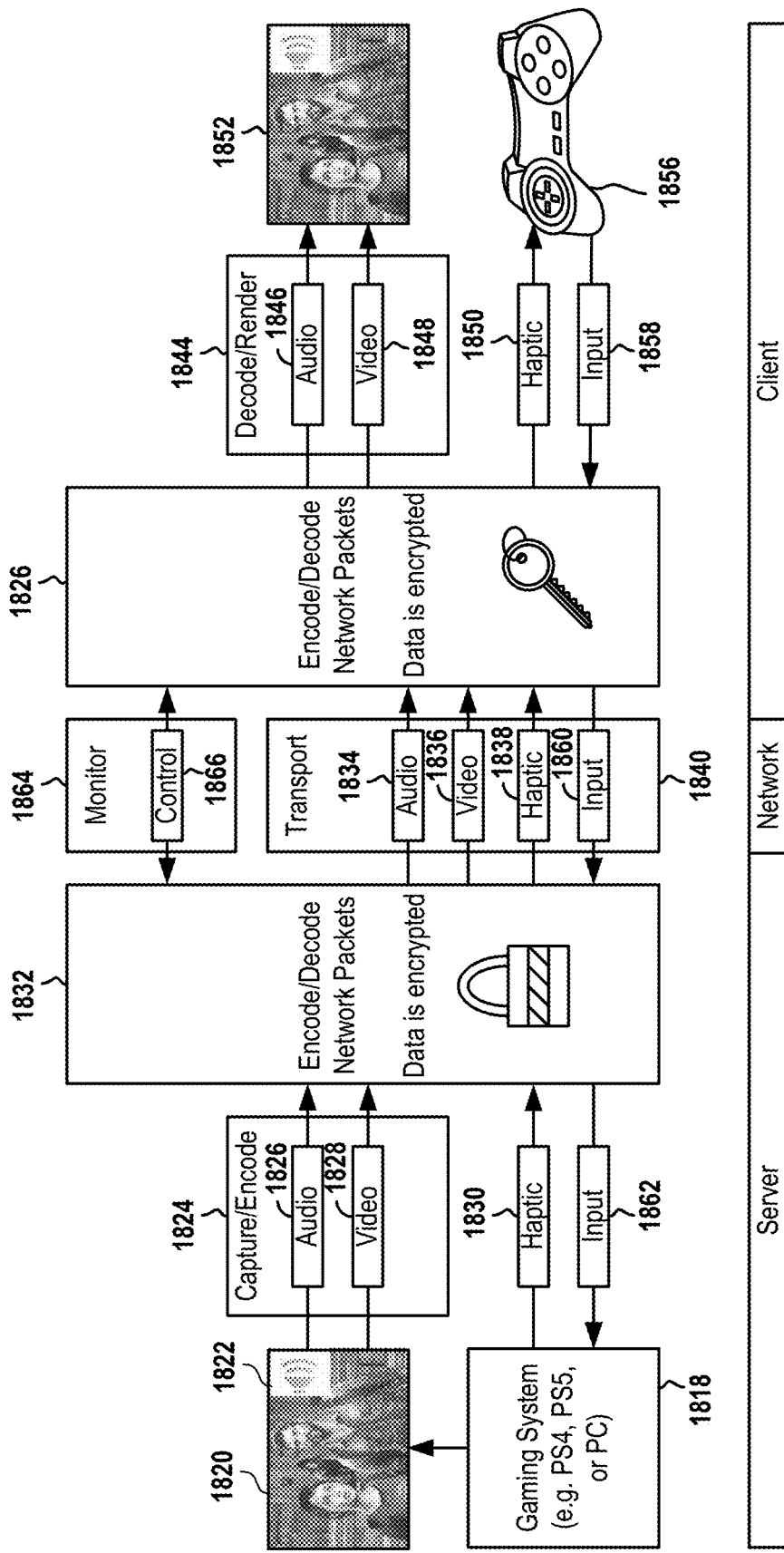
FIG. 18B is a flow diagram conceptually illustrating various operations which are performed for streaming a cloud video game to a client device, in accordance with implementations of the disclosure.

FIG. 18B is a flow diagram conceptually illustrating various operations which are performed for streaming a cloud video game to a client device, in accordance with implementations of the disclosure.

The gaming system 1818 executes a video game and generates raw (uncompressed) video 1820 and audio 1822. The video 1820 and audio 1822 are captured and encoded for streaming purposes, as indicated at reference 1824 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/18, etc.

The encoded audio 1826 and encoded video 1828 are further packetized into network packets, as indicated at reference numeral 1832, for purposes of transmission over a network such as the Internet. The network packet encoding process can also employ a data encryption process, thereby providing enhanced data security. In the illustrated implementation, audio packets 1834 and video packets 1836 are generated for transport over the network, as indicated at reference 1840.

The gaming system 1818 additionally generates haptic feedback data 1830, which is also packetized into network packets for network transmission. In the illustrated implementation, haptic feedback packets 1838 are generated for transport over the network, as further indicated at reference 1840.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 1840, the audio, video, and haptic feedback packets are transported over a network, such as and/or including the Internet. As indicated at reference

1842, the audio packets 1834, video packets 1836, and haptic feedback packets 1838, are decoded/reassembled by the client device to define encoded audio 1846, encoded video 1848, and haptic feedback data 1850 at the client device. If the data has been encrypted, then the network packets are also decrypted. The encoded audio 1846 and encoded video 1848 are then decoded by the client device, as indicated at reference 1844, to generate client-side raw audio and video data for rendering on a display device 1852. The haptic feedback data 1850 can be processed/communicated to produce a haptic feedback effect at a controller device 1856 or other interface device through which haptic effects can be rendered. One example of a haptic effect is a vibration or rumble of the controller device 1856.

It will be appreciated that a video game is responsive to user inputs, and thus, a similar procedural flow to that described above for transmission and processing of user input, but in the reverse direction from client device to server, can be performed. As shown, a user operating controller device 1856 may generate input data 1858. This input data 1858 is packetized at the client device for transport over the network to the cloud gaming system. The input data packets 1860 are unpacked and reassembled by the cloud gaming server to define input data 1862 on the server-side. The input data 1862 is fed to the gaming system 1818, which processes the input data 1862 to update the game state of the video game.

During transport (ref. 1840) of the audio packets 1834, video packets 1836, and haptic feedback packets 1838, the transmission of data over the network can be monitored to ensure the cloud game stream quality of service. For example, network conditions can be monitored as indicated by reference 1864, including both upstream and downstream network bandwidth, and the game streaming can be adjusted in response to changes in available bandwidth. That is, the encoding and decoding of network packets can be controlled based on present network conditions, as indicated by reference 1866.

Figure 19:
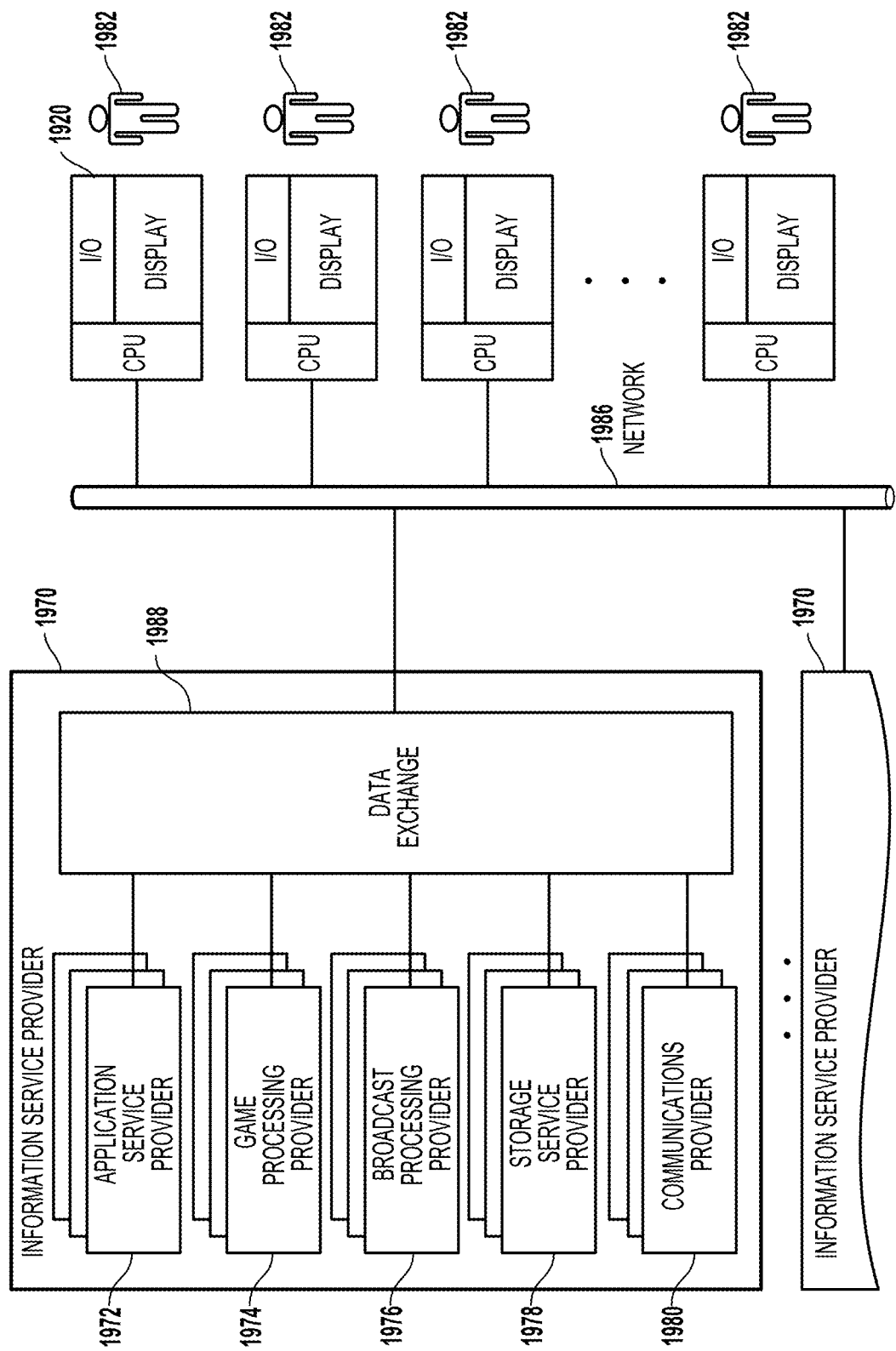
FIG. 19 illustrates an embodiment of an Information Service Provider architecture, in accordance with implementations of the disclosure.

FIG. 19 illustrates an embodiment of an Information Service Provider architecture, in accordance with implementations of the disclosure.

Information Service Providers (ISP) 1970 delivers a multitude of information services to users 1982 geographically dispersed and connected via network 1986. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1970 includes Application Service Provider (ASP) 1972, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1970 includes a Game Processing Server (GPS) 1974 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1976 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1978 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1980 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1988 interconnects the several modules inside ISP 1970 and connects these modules to users 1982 via network 1986. Data Exchange 1988 can cover a small area where all the modules of ISP 1970 are in close proximity, or can cover a large geographic area when the different modules are geographically dispersed. For example, Data Exchange 1988 can include a fast Gigabit Ethernet (or faster) within a cabinet of a data center, or an intercontinental virtual area network (VLAN).

Users 1982 access the remote services with client device 1984, which includes at least a CPU, a memory, a display and I/O. The client device can be a PC, a mobile phone, a netbook, tablet, gaming system, a PDA, etc. In one embodiment, ISP 1970 recognizes the type of device used by the client and adjusts the communication method employed. In other cases, client devices use a standard communications method, such as html, to access ISP 1970.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

The invention claimed is:

1. A method for providing access to multi-file related tasks with version control, comprising:
   receiving, through a task interface application executed by a client device, a command to open a task for processing by a local tool application on the client device, the command to open the task further identifying a specific version of the task;
   responsive to the command to open the task, transmitting, from the client device over a network to a server, a request for a plurality of files associated to the specific version of the task;

wherein the task further includes metadata associated thereto, the metadata describing a role of said files, who created a particular version of said files, when the particular version was created, and how a given file is used in association with other files;

wherein the command to open the task is received through the task interface application without identifying specific ones of the plurality of files that are associated to the specific version of the task;

receiving, by the client device over the network from the server, the plurality of files associated to the specific version of the task;

initiating, by the task interface application, opening of the received plurality of files by the local tool application for editing on the client device.

2. The method of claim 1, wherein the task interface application communicates with the local tool application through a plug-in interface of the local tool application.

3. The method of claim 1, further comprising:

after the editing of the plurality of files through the local tool application on the client device, then receiving, through the task interface application, a command to version up the task;

responsive to the command to version up the task, transmitting, from the client device over the network to the server, a request to store a new version of the task, and uploading the edited plurality of files from the client device to the server, wherein responsive to the request to store the new version of the task, the server generates the new version of the task and stores the edited plurality of files in association with the new version of the task.

4. The method of claim 1, wherein the specific version is one of a plurality of versions of the task, each of the versions of the task having one or more files associated thereto.

5. The method of claim 1, wherein the server accesses an asset management system to obtain the plurality of files associated to the specific version of the task.

6. The method of claim 5, wherein the task interface application provides a view of a plurality of tasks stored to the asset management system.

7. The method of claim 6, wherein the view is filtered by an assignment setting to a user of the client device.

8. The method of claim 5, wherein the view further includes a priority setting of the tasks.

9. A non-transitory computer readable medium having program instructions embodied thereon, that, when executed by at least one processor, cause said at least one processor to perform a method for providing access to multi-file related tasks with version control, said method comprising:

receiving, through a task interface application executed by a client device, a command to open a task for processing by a local tool application on the client device, the command to open the task further identifying a specific version of the task;

responsive to the command to open the task, transmitting, from the client device over a network to a server, a request fora plurality of files associated to the specific version of the task;

wherein the task further includes metadata associated thereto, the metadata describing a role of said files, who created a particular version of said files, when the particular version was created, and how a given file is used in association with other files;

wherein the command to open the task is received through the task interface application without identifying specific ones of the plurality of files that are associated to the specific version of the task;

receiving, by the client device over the network from the server, the plurality of files associated to the specific version of the task;

initiating, by the task interface application, opening of the received plurality of files by the local tool application for editing on the client device.

10. The non-transitory computer readable medium of claim 9, wherein the task interface application communicates with the local tool application through a plug-in interface of the local tool application.

11. The non-transitory computer readable medium of claim 9, further comprising:

after the editing of the plurality of files through the local tool application on the client device, then receiving, through the task interface application, a command to version up the task;

responsive to the command to version up the task, transmitting, from the client device over the network to the server, a request to store a new version of the task, and uploading the edited plurality of files from the client device to the server, wherein responsive to the request to store the new version of the task, the server generates the new version of the task and stores the edited plurality of files in association with the new version of the task.

12. The non-transitory computer readable medium of claim 9, wherein the specific version is one of a plurality of versions of the task, each of the versions of the task having one or more files associated thereto.

13. The non-transitory computer readable medium of claim 9, wherein the server accesses an asset management system to obtain the plurality of files associated to the specific version of the task.

14. The non-transitory computer readable medium of claim 13, wherein the task interface application provides a view of a plurality of tasks stored to the asset management system.

15. The non-transitory computer readable medium of claim 14, wherein the view is filtered by an assignment setting to a user of the client device.

16. The non-transitory computer readable medium of claim 13, wherein the view further includes a priority setting of the tasks.

* * * * *